(12) United States Patent
Asai

(10) Patent No.: US 10,111,052 B2
(45) Date of Patent: Oct. 23, 2018

(54) COMMUNICATION MANAGEMENT SYSTEM, COMMUNICATION MANAGEMENT METHOD, AND COMPUTER READABLE MEDIUM FOR CONTROLLING TRANSMISSION OF A REQUEST TO ADD A DESTINATION CANDIDATE

(71) Applicant: Takahiro Asai, Kanagawa (JP)

(72) Inventor: Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/335,793

(22) Filed: Oct. 27, 2016

(65) Prior Publication Data
US 2017/0048683 A1 Feb. 16, 2017

Related U.S. Application Data

(63) Continuation of application No. PCT/JP2015/063538, filed on Apr. 30, 2015.

(30) Foreign Application Priority Data

Apr. 30, 2014 (JP) .................................. 2014-093337

(51) Int. Cl.
*H04M 3/42* (2006.01)
*H04L 12/28* (2006.01)
(Continued)

(52) U.S. Cl.
CPC ............ *H04W 4/06* (2013.01); *H04L 12/1813* (2013.01); *H04L 12/1822* (2013.01);
(Continued)

(58) Field of Classification Search
CPC ............ H04L 12/1813; H04L 12/1822; H04L 65/403; H04L 65/1093; H04N 7/147;
(Continued)

(56) References Cited

U.S. PATENT DOCUMENTS 7,639,698 B1 * 12/2009 Sylvain .................. H04L 47/20
370/230
8,495,155 B2 * 7/2013 Battle ..................... H04L 51/04
709/206
(Continued)

FOREIGN PATENT DOCUMENTS

EP         1 608 117 A1    12/2005
JP       2006-074453        3/2006
(Continued)

OTHER PUBLICATIONS

Extended Search Report dated Mar. 20, 2017 in European Patent Application No. 15786360.6.
(Continued)

*Primary Examiner* — Rafael Pérez-Gutiérrez
*Assistant Examiner* — Mark G. Pannell
(74) *Attorney, Agent, or Firm* — Oblon, McClelland, Maier & Neustadt, L.L.P.

(57) ABSTRACT

A communication management system includes: a group management unit that manages group identification information for identifying a group to which an addition request source terminal requesting to add a destination candidate belongs, in association with group identification information for identifying a group to which an addition request target terminal being able to become the destination candidate belongs; a receiving unit that receives an addition request transmitted by a first communication terminal and requesting to add a second communication terminal as a destination candidate; and a transmission controlling unit that does not transmit the approval request to the second communication terminal, when first group identification information for the first communication terminal is group identification information for an addition request source terminal, and second group identification information for the second communication terminal is not included in at least one corresponding (Continued)

piece of group identification information for an addition request target terminal.

8 Claims, 23 Drawing Sheets

(51) Int. Cl.
| | |
|---|---|
| H04L 12/56 | (2006.01) |
| H04W 4/06 | (2009.01) |
| H04W 76/10 | (2018.01) |
| H04W 4/08 | (2009.01) |
| H04L 12/18 | (2006.01) |
| H04N 7/14 | (2006.01) |
| H04W 12/08 | (2009.01) |
| H04W 48/12 | (2009.01) |
| H04L 29/06 | (2006.01) |
| H04N 7/15 | (2006.01) |
| H04W 88/02 | (2009.01) |

(52) U.S. Cl.
 CPC .............. *H04N 7/147* (2013.01); *H04W 4/08* (2013.01); *H04W 12/08* (2013.01); *H04W 48/12* (2013.01); *H04W 76/10* (2018.02); *H04L 65/1093* (2013.01); *H04L 65/403* (2013.01); *H04N 7/152* (2013.01); *H04W 88/02* (2013.01)

(58) Field of Classification Search
 CPC ........ H04N 7/152; H04W 12/08; H04W 4/06; H04W 4/08; H04W 4/12; H04W 76/02; H04W 88/02
 USPC ......................................................... 455/416
 See application file for complete search history.

(56) References Cited

U.S. PATENT DOCUMENTS

| | | | | |
|---|---|---|---|---|
| 2002/0007396 | A1* | 1/2002 | Takakura | H04W 4/08 709/205 |
| 2002/0126654 | A1 | 9/2002 | Preston et al. | |
| 2002/0165938 | A1* | 11/2002 | Lautenschlager | G08G 1/096811 709/217 |
| 2002/0184200 | A1* | 12/2002 | Ueda | G01C 21/28 |
| 2005/0059412 | A1* | 3/2005 | Hosokawa | G06Q 30/02 455/456.1 |
| 2007/0100944 | A1 | 5/2007 | Ford et al. | |
| 2008/0104690 | A1* | 5/2008 | Hirai | H04W 12/06 726/14 |
| 2009/0022301 | A1* | 1/2009 | Mudaliar | H04M 3/54 379/221.14 |
| 2009/0106377 | A1* | 4/2009 | McQuillen | H04L 51/02 709/206 |
| 2010/0005026 | A1* | 1/2010 | Waldman | G06Q 10/10 705/44 |
| 2010/0287605 | A1 | 11/2010 | Strandell | |
| 2011/0216699 | A1 | 9/2011 | Umehara et al. | |
| 2012/0314019 | A1 | 12/2012 | Asai | |
| 2013/0125010 | A1 | 5/2013 | Strandell | |
| 2013/0223292 | A1* | 8/2013 | Okuyama | H04L 65/1069 370/261 |
| 2014/0189058 | A1 | 7/2014 | Asai | |
| 2014/0324975 | A1 | 10/2014 | Tamura | |
| 2014/0362741 | A1 | 12/2014 | Okuyama et al. | |
| 2014/0375757 | A1 | 12/2014 | Asai | |
| 2015/0121253 | A1* | 4/2015 | Kanda | H04M 1/72583 715/753 |
| 2015/0282233 | A1 | 10/2015 | Homma et al. | |
| 2017/0006522 | A1* | 1/2017 | Nishimura | H04W 8/186 |

FOREIGN PATENT DOCUMENTS

| | | |
|---|---|---|
| JP | 2007-052801 | 3/2007 |
| JP | 2013-085208 | 5/2013 |
| JP | 2014-233068 | 12/2014 |
| JP | 2015-201827 | 11/2015 |
| WO | 2010/128202 | 11/2010 |
| WO | 2012/074124 | 6/2012 |

OTHER PUBLICATIONS

International Search Report dated Jul. 21, 2015 in PCT/JP2015/063538 filed on Apr. 30, 2015.

Written Opinion dated Jul. 21, 2015 in PCT/JP2015/063538, filed on Apr. 30, 2015.

\* cited by examiner

FIG.9
VISUAL INFORMATION MANAGEMENT TABLE
| OPERATING CONDITION | VISUAL INFORMATION (ICON) |
|---|---|
| ONLINE (POSSIBLE TO CALL) |  |
| ONLINE (NOW TALKING) |  |
| ONLINE (TEMPORARILY SUSPENDED) |  |
| OFFLINE |  |

FIG.10

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.11

TERMINAL MANAGEMENT TABLE

| TERMINAL ID | TERMINAL NAME | OPERATING CONDITION | RECEPTION DATE AND TIME | TERMINAL IP ADDRESS |
|---|---|---|---|---|
| 01aa | JAPAN TOKYO OFFICE AA TERMINAL | ONLINE (POSSIBLE TO CALL) | 2013.11.01.13:40 | 1.2.1.3 |
| 01ab | JAPAN TOKYO OFFICE AB TERMINAL | OFFLINE | 2013.11.09.12:00 | 1.2.1.4 |
| ... | ... | ... | ... | ... |
| 07aa | JAMES'S SMARTPHONE | ONLINE (TEMPORARILY SUSPENDED) | 2013.11.10.13:45 | 1.2.2.4 |
| 07ab | KURT'S SMARTPHONE | ONLINE (POSSIBLE TO CALL) | 2013.11.10.13:50 | 1.2.2.4 |
| ... | ... | ... | ... | ... |
| 07ba | RICOH'S SMARTPHONE | ONLINE (NOW TALKING) | 2013.11.10.12:45 | 1.3.1.3 |
| 07bb | NABETA'S SMARTPHONE | ONLINE (POSSIBLE TO CALL) | 2013.11.10.13:55 | 1.3.1.4 |
| ... | ... | ... | ... | ... |

FIG.12

DESTINATION LIST MANAGEMENT TABLE

| REQUEST SOURCE TERMINAL ID | DESTINATION TERMINAL ID |
|---|---|
| 01aa | 01ab, 01ac, ⋯ |
| 01ab | 01aa, 01ac, ⋯ |
| ⋯ | ⋯ |
| 07aa | 07ab, 07ac, ⋯ |
| 07ab | 07aa, 07ac, ⋯ |
| ⋯ | ⋯ |
| 07ba | 07bb, 07bc, ⋯ |
| 07bb | 07ba, 07bc, ⋯ |
| ⋯ | ⋯ |

FIG.13

ADDITION REQUEST MANAGEMENT TABLE

| REQUEST SOURCE TERMINAL ID | REQUEST TARGET TERMINAL ID |
|---|---|
| 07ba | 07aa |
| 01aa | 07aa |
| ... | ... |

FIG.14

APP USE TERMINAL MANAGEMENT TABLE

| GROUP ID | TERMINAL ID BELONGING TO GROUP |
|---|---|
| g01 | 01aa, 01ab, ··· |
| g02 | 07aa, 07ab, ··· |
| g03 | 07ba, 07bb, ··· |
| ··· | ··· |

FIG.15

APP MANAGEMENT TABLE

| GROUP ID | GROUP NAME | GROUP ID OF ADDITION REQUEST POSSIBLE GROUP |
|---|---|---|
| g01 | SPECIAL (CHARGED) | g01, g02, g03 |
| g02 | STANDARD (CHARGED) | g01, g02 |
| g03 | FREE | g01 |
| ... | ... | ... |

FIG.17

| CON-DITION | TERMINAL ID | TERMINAL NAME |
|---|---|---|
| 📞 | 10ab | JAPAN TOKYO OFFICE AB TERMINAL |
| ☎ | 10ac | JAPAN TOKYO OFFICE AC TERMINAL |
| 📞 | 10ad | JAPAN TOKYO OFFICE AD TERMINAL |
| 📞 | 10ae | JAPAN TOKYO OFFICE AE TERMINAL |

ADD DES-TINATION

COMMUNICATION MANAGEMENT SYSTEM, COMMUNICATION MANAGEMENT METHOD, AND COMPUTER READABLE MEDIUM FOR CONTROLLING TRANSMISSION OF A REQUEST TO ADD A DESTINATION CANDIDATE

CROSS-REFERENCE TO RELATED APPLICATIONS

This application is a continuation of PCT international application Ser. No. PCT/JP2015/063538 filed on Apr. 30, 2015 which designates the United States, and which claims the benefit of priority from Japanese Patent Application No. 2014-093337, filed on Apr. 30, 2014; the entire contents of which are incorporated herein by reference.

BACKGROUND OF THE INVENTION

1. Field of the Invention

The present invention relates to a communication management system, a communication management method, and a computer program product that manage a destination candidate for a certain communication terminal for communication.

2. Description of the Related Art

A plurality of kinds of communication applications are installed on smartphones, personal computers (PCs), and other devices, so that the devices can communicate under various protocols.

In a conventional technology (see Japanese Patent Application Laid-open No. 2006-074453), in order for a user to easily select a desired destination terminal from destination candidates for communication, a communication start request source terminal that requests to start communication displays a list of destinations, so that the user can select the desired destination terminal.

If, on the same communication network (communication platform), a first user registers a communication terminal of a second user as a destination candidate in a destination list of the first user's terminal without receiving any approval from the second user, the second user receives an unexpected communication start request from the first user, which may bother the second user. Under the circumstances, a technique (see Japanese Patent Application Laid-open No. 2013-085208) has been disclosed in which a management server transmits, to a communication terminal that can become a destination candidate, an approval request that asks the communication terminal whether it is good to include the communication in the destination list as a destination candidate before the management server includes the communication terminal in the destination list as a destination candidate, so as to prevent the second user's terminal from being unexpectedly included in the destination list of the first user's terminal.

There are cases, however, in which various application providers (vendors) provide users with communication applications on the same communication network (communication platform). There are other cases in which the same application provider (vendor) provides users with different types of communication applications, or in which the same communication application provides the users with different services depending on, for example, service rates. Consequently, if the management server transmits an approval request to a communication terminal without any limitations, the approval request may not correspond to the service form depending on the communication network (communication platform), the application provider, and/or the like.

SUMMARY OF THE INVENTION

A communication management system receives, from a certain communication terminal, an addition request requesting to add a destination candidate and transmits, to another communication terminal, an approval request asking whether to approve the addition request. The communication management system includes: a group management unit that manages group identification information for identifying a group to which an addition request source terminal that is an addition request source requesting to add the destination candidate belongs, in association with group identification information for identifying a group to which an addition request target terminal that is an addition request target being able to become the destination candidate belongs; a receiving unit that receives an addition request transmitted by a first communication terminal, the addition request requesting to add a second communication terminal as a destination candidate for the first communication terminal; and a transmission controlling unit that does not transmit the approval request to the second communication terminal based on reception of the addition request by the receiving unit, when first group identification information for identifying a group to which the first communication terminal belongs is group identification information for an addition request source terminal in the group management unit, and second group identification information for identifying a group to which the second communication terminal belongs is not included in at least one corresponding piece of group identification information for an addition request target terminal in the group management unit.

BRIEF DESCRIPTION OF THE DRAWINGS

FIG. 9 is a schematic diagram of a visual information management table.

FIG. 10 is a schematic diagram of an authentication management table.

FIG. 11 is a schematic diagram of a terminal management table.

FIG. 12 is a schematic diagram of a destination list management table.

FIG. 13 is a schematic diagram of an addition request management table.

FIG. 14 is a schematic diagram of a group use terminal management table.

FIG. 15 is a schematic diagram of a group management table.

FIG. 17 is a schematic diagram of an addition approval request screen.

DETAILED DESCRIPTION OF THE PREFERRED EMBODIMENTS

The following describes an embodiment of the present invention with reference to FIGS. 1 to 23.

Overall Configuration of Embodiment

Figure 1:
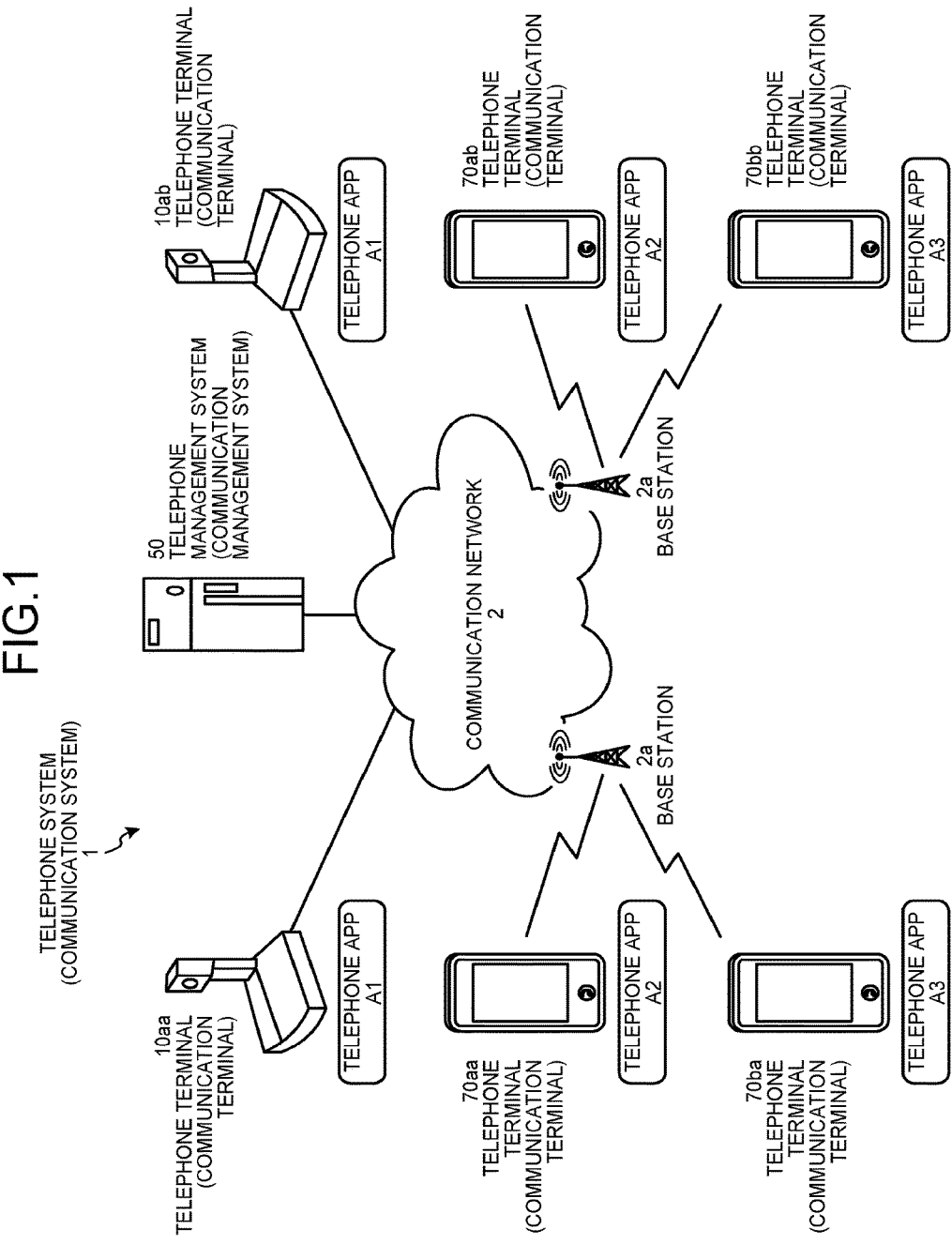
FIG. 1 is a schematic diagram of a telephone system according to an embodiment of the present invention.

FIG. 1 is a schematic diagram of a telephone system according to an embodiment of the present invention. As illustrated in FIG. 1, a telephone system 1 includes a plurality of telephone terminals (10aa, 10ab) such as video conference devices, a plurality of telephone terminals (70aa, 70ab, 70ba, 70bb) such as smartphones, and a telephone management system 50 that manages the telephone terminals.

Although FIG. 1 only illustrates two telephone terminals (10aa, 10ab) and four telephone terminals (70aa, 70ab, 70ba, 70bb) in order to make explanation easier, the number of telephone terminals is not limited to this. In the following description, any telephone terminal of the telephone terminals (10aa, 10ab) is referred to as a "telephone terminal 10", and any telephone terminal of the telephone terminals (70aa, 70ab, 70ba, 70bb) is referred to as a "telephone terminal 70". Any telephone terminal of the telephone terminals (70aa, 70ab) is referred to as a "telephone terminal 70a", and any telephone terminal of the telephone terminals (70ba, 70bb) is referred to as a "telephone terminal 70b".

The telephone management system 50 is a computer having a server function. In the telephone system 1, a telephone call can be implemented between a user of the telephone terminal 10 and a user of the telephone terminal 70. The users can communicate by using, for example, voice, video (image), and text data. The word "application" may be abbreviated to "app" in the following description. The telephone terminals (10, 70) and the telephone management system 50 can communicate with each other via a communication network 2 such as the Internet, a mobile phone network, and/or a local area network (LAN). In the present embodiment, the communication network 2 also includes base stations (2a, 2b) that are at ends of the mobile phone network and directly communicate with the telephone terminals 70.

Although FIG. 1 only illustrates two base stations (2a, 2b) in order to make explanation easier, the number of base stations is not limited to this. Each telephone terminal is an example of a communication terminal. The communication terminal also includes, for example, a car navigation device to be described later. The telephone management system 50 is an example of a communication management system that performs data communication. The telephone system is an example of a communication system for data communication that is not limited to telephone calls.

In FIG. 1, "communication apps A1" of the same kind are installed on the telephone terminals 10aa and 10ab. Further, "communication apps A2" of the same kind are installed on the respective telephone terminals 70aa and 70ab. Furthermore, "communication apps A1" of the same kind are installed on the telephone terminals 70ba and 70bb. The three types of communication apps (A1, A2, A3) are provided by different app providers, and the respective telephone terminals are charged different rates for the use of these apps. The communication apps include telephone apps and messaging apps such as Skype, Google Talk, LINE, FaceTime, Kakao Talk, and Tango (registered trademark or unregistered trademark) in addition to communication apps for video conferences. In the present embodiment, a plurality of types of communication apps use the same communication platform (the communication network 2 including the telephone management system 50), and a telephone call can be implemented at least between communication apps of the same kind.

Hardware Configuration of Embodiment

Figure 2:
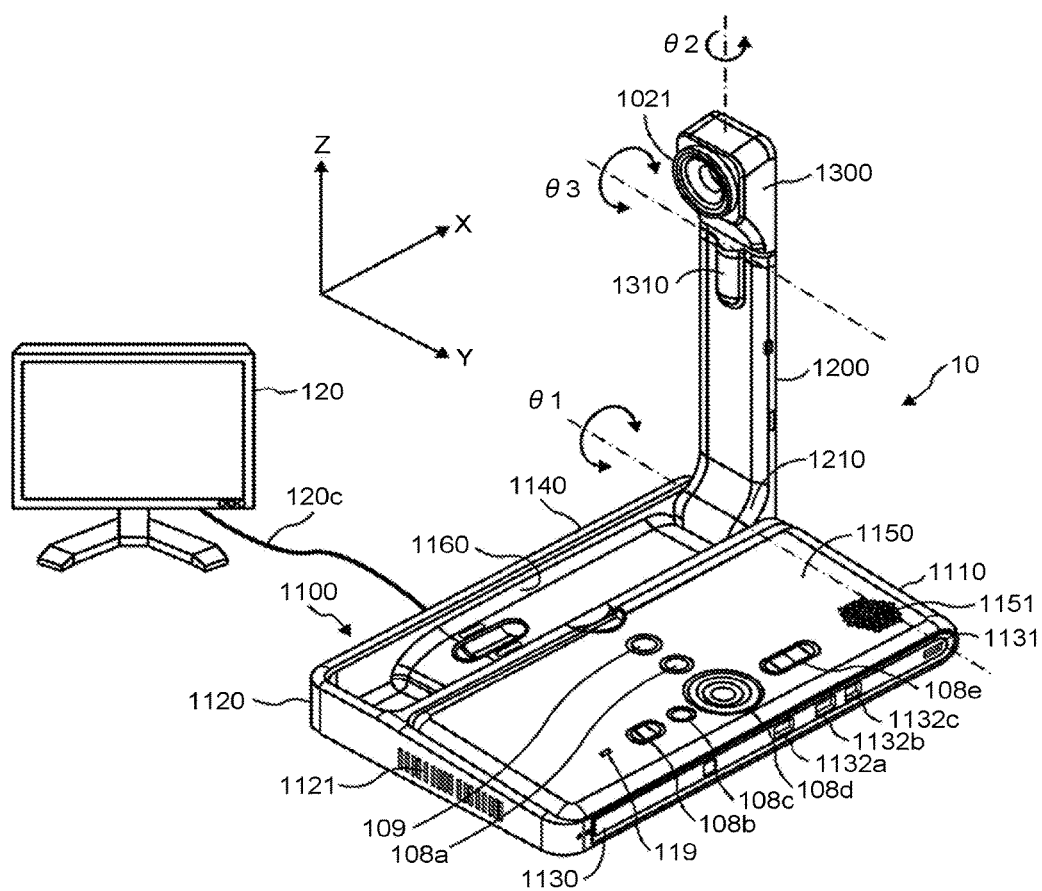
FIG. 2 illustrates an example of an external view of a telephone terminal 10.

Described next is a hardware configuration of the present embodiment. FIG. 2 illustrates an external view of the telephone terminal 10 according to the present embodiment. As illustrated in FIG. 2, the telephone terminal 10 includes a housing 1100, an arm 1200, and a camera housing 1300. Provided on a front wall 1110 of the housing 1100 is an air inlet surface (not illustrated) formed with a plurality of air inlets, and provided on a rear surface 1120 of the housing 1100 is an air outlet surface 1121 formed with a plurality of air outlets. Driving a cooling fan installed in the housing 1100 can take the outside air from the rear side of the telephone terminal 10 through the air inlet surface (not illustrated), and can discharge the air to the rear side of the telephone terminal 10 through the air outlet surface 1121. A sound inlet 1131 is formed on a right wall 1130 of the housing 1100, and a built-in microphone 114 to be described later can collect, for example, voice, sounds, and noises.

An operating panel 1150 is formed on the housing 1100 near the right wall 1130. Provided on the operating panel 1150 are a plurality of operating buttons (108a to 108e) to be described later, a power switch 109 to be described later, and an alarm lamp 119 to be described later. Also formed on the operating panel 1150 is a sound outlet surface 1151 formed with a plurality of sound outlets through which output sound from a built-in speaker 115 to be described later is output. An accommodating section 1160 as a recessed part for accommodating the arm 1200 and the camera housing 1300 is formed on the housing 1100 near the left wall 1140. Provided on the right wall 1130 of the housing 1100 are a plurality of connection ports (1132a to 1132c) through which a cable is electrically connected to an external device connection I/F 118 to be described later. Provided on the left wall 1140 of the housing 1100 is a connection port (not illustrated) through which a cable 120c of a display 120 is electrically connected to the external device connection I/F 118 to be described later.

In the following description, any operating button of the operating buttons (108a to 108e) is referred to as an "operating button 108", and any connection port of the connection ports (1132a to 1132c) is referred to as a "connection port 1132".

The arm 1200 is installed to the housing 1100 via a torque hinge 1210. The arm 1200 is rotatably movable upwards and downwards within a tilt angle □1 of 135 degrees relative to the housing 1100. FIG. 2 illustrates a state in which the tilt angle □1 is 90 degrees. Provided in the camera housing 1300 is a built-in camera 112 to be described later that can capture images of a user, a document, and a room, for example. The camera housing 1300 is provided with a torque hinge 1310. The camera housing 1300 is installed to the arm 1200 via the torque hinge 1310. The camera housing 1300 is installed to the arm 1200 via the torque hinge 1310, and the camera housing 1300 is rotatably movable upwards, downwards, leftwards and rightwards within a pan angle □2 of □180 degrees and within a tilt angle □3 of □45 degrees with the state illustrated in FIG. 2 being 0 degree relative to the arm 1200.

The external view illustrated in FIG. 2 is for illustrative purposes only, and the external view of the telephone terminal 10 is not limited to this. The telephone terminal 10 may also be a general PC, a smartphone, or a tablet, for example. The camera and the microphone are not necessarily built-in devices, but may be external devices. The external view of the telephone management system 50 is the same as that of a general server computer, and thus explanation of the external view thereof is omitted. The external view of the telephone terminal 70 is the same as that of a general smartphone, and thus explanation of the external view thereof is omitted.

Figure 3:
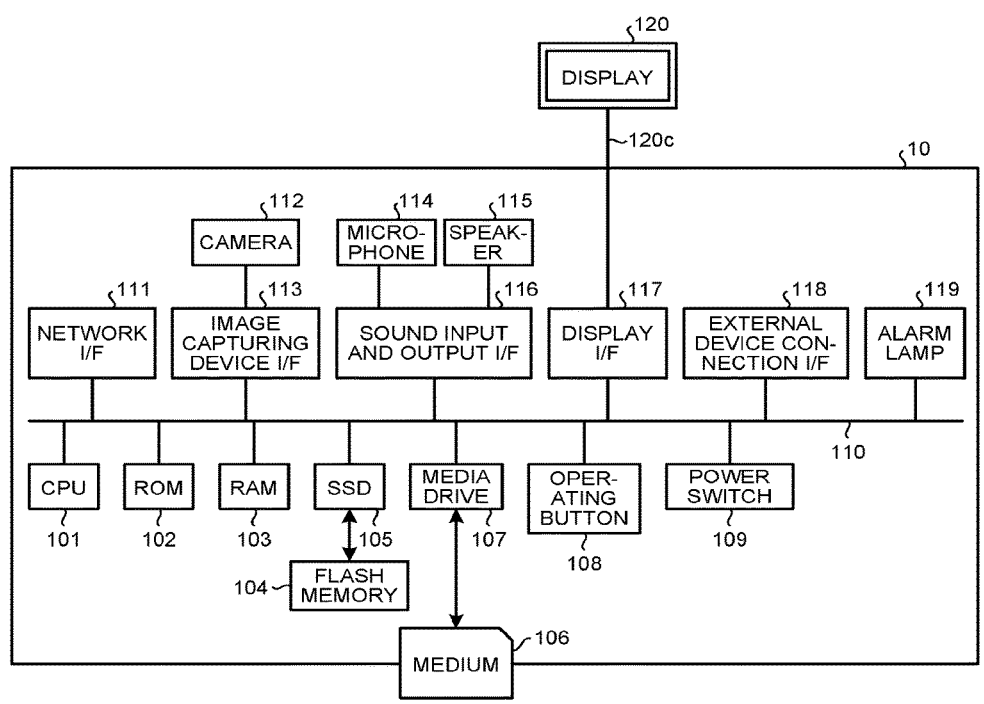
FIG. 3 illustrates a hardware configuration of the telephone terminal 10.

FIG. 3 illustrates a hardware configuration of the telephone terminal 10 according to the present embodiment. As illustrated in FIG. 3, the telephone terminal 10 according to the present embodiment includes a central processing unit (CPU) 101, a read only memory (ROM) 102, a random access memory (RAM) 103, a flash memory 104, a solid state drive (SSD) 105, a media drive 107, the operating button 108, the power switch 109, and a network interface (I/F) 111. The CPU 101 controls the overall operation of the telephone terminal 10. The ROM 102 stores therein computer programs, such as an initial program loader (IPL), for driving the CPU 101. The RAM 103 is used as a work area for the CPU 101. The flash memory 104 stores therein various kinds of data such as a computer program for the telephone terminal 10, image data and sound data. The SSD 105 controls read and write of various kinds of data on the flash memory 104 under the control of the CPU 101. The media drive 107 controls read and write (storage) of data on a recording medium 106 such as a flash memory. The operating button 108 is operated for selecting a destination of the telephone terminal 10, for example. The power switch 109 switches on and off the telephone terminal 10. The network I/F 111 transmits data by using the communication network 2.

Figure 5:
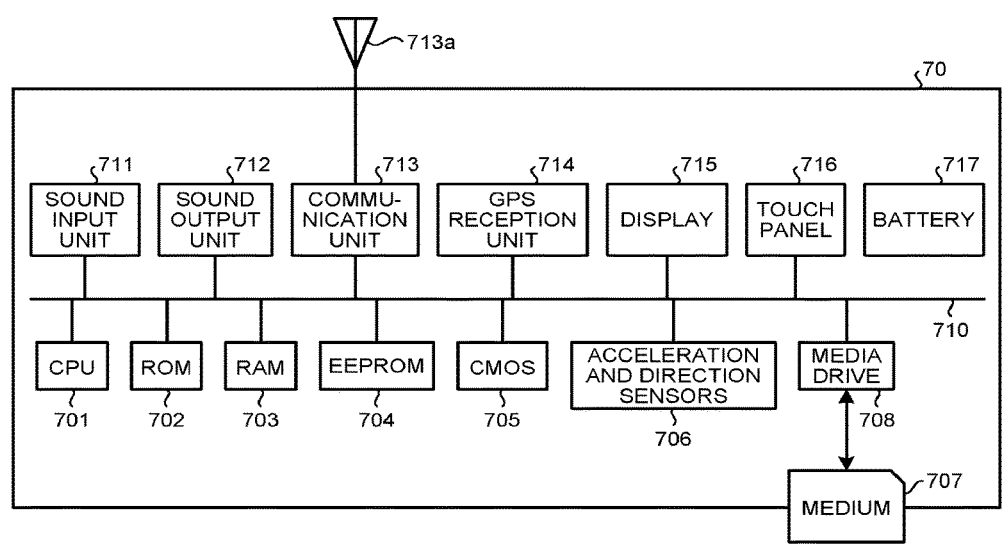
FIG. 5 illustrates a hardware configuration of a telephone terminal 70.

The telephone terminal 10 also includes the built-in camera 112, an image capturing device I/F 113, the built-in microphone 114, the built-in speaker 115, a sound input and output I/F 116, a display I/F 117, the external device connection I/F 118, the alarm lamp 119, and a bus line 110. The built-in camera 112 captures an image of a subject under the control of the CPU 101 to obtain image data. The image capturing device I/F 113 controls driving of the camera 112. The built-in microphone 114 receives sounds. The built-in speaker 115 outputs sounds. The sound input and output I/F 116 performs input and output processing of sound signals with the microphone 114 and the speaker 115 under the control of the CPU 101. The display I/F 117 transmits image data to the external display 120 under the control of the CPU 101. The external device connection I/F 118 is to connect various external devices. The alarm lamp 119 issues a notification of abnormality of the function of the telephone terminal 10. The bus line 110 is such as an address bus and a data bus electrically connects the constituent elements with one another as illustrated in FIG. 5.

The display 120 is a display unit including liquid crystal or organic electroluminescence (EL) that displays an image of a subject, an image for operation and/or the like. The display 120 is connected to the display I/F 117 via the cable 120*c*. The cable 120*c* may be a cable for analog RGB (VGA) signals, a cable for component video signals, a cable for high-definition multimedia interface (HDMI) signals, or a cable for digital video interactive (DVI) signals.

The camera 112 includes a lens and a solid-state image sensor that converts light into electric charge to generate an electronic image (video) of a subject, and a complementary metal oxide semiconductor (CMOS), a charge coupled device (CCD), or the like is used as the solid-state image sensor.

Figure 6:
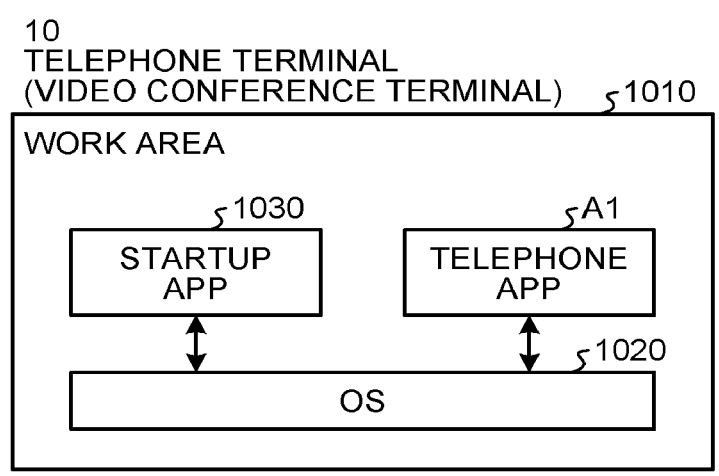
FIG. 6 illustrates a software configuration of the telephone terminal 10.

An external device such as an external camera, an external microphone, and an external speaker can be electrically connected to the external device connection I/F 118 via, for example, a universal serial bus (USB) cable inserted into the connection port 1132 of the housing 1100 illustrated in FIG. 6. When the external camera is connected, the external camera is driven with priority over the built-in camera 112 under the control of the CPU 101. In the same manner, when the external microphone or the external speaker is connected, the external microphone or the external speaker is driven with priority over the built-in microphone 114 or the built-in speaker 115 under the control of the CPU 101.

The recording medium 106 can be attached to and detached from the telephone terminal 10. Another memory such as an electrically erasable and programmable ROM (EEPROM) may be used instead of the flash memory 104 as long as the memory is a non-volatile memory from and to which data is read and written under the control of the CPU 101.

Figure 4:
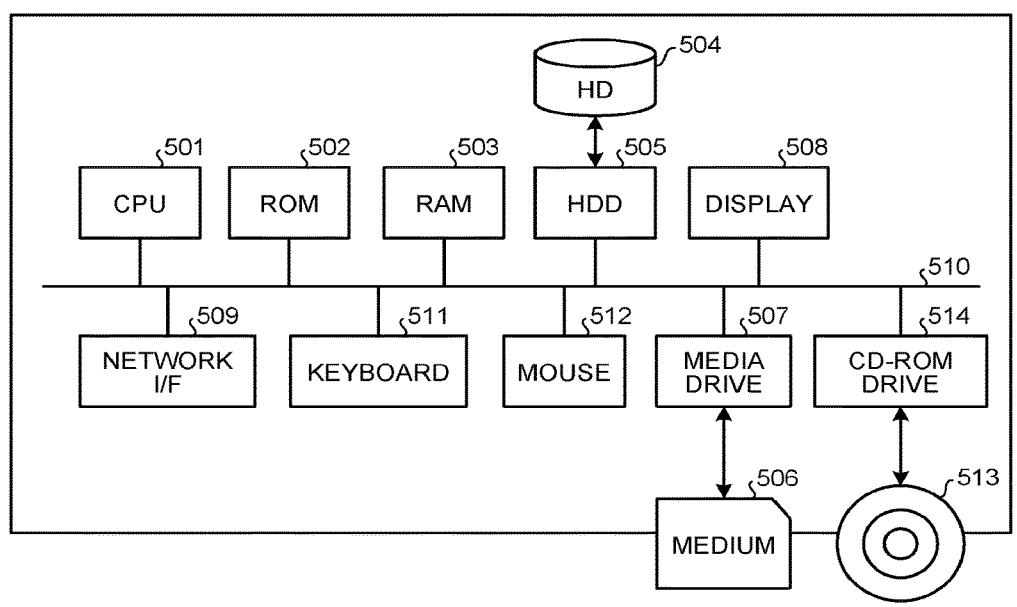
FIG. 4 illustrates a hardware configuration of a telephone management system 50.

FIG. 4 illustrates a hardware configuration of the communication management system 50 according to the embodiment of the present invention. The communication management system 50 includes a CPU 501, a ROM 502, a RAM 503, a hard disk (HD) 504, a hard disk drive (HDD) 505, a media drive 507, a display 508, a network I/F 509, a keyboard 511, a mouse 512, a compact disc read only memory (CD-ROM) drive 514, and a bus line 510. The CPU 501 controls the overall operation of the communication management system 50. The ROM 502 stores therein computer programs such as IPL for driving the CPU 501. The RAM 503 is used as a work area for the CPU 501. The HD 504 stores therein various kinds of data such as a computer program for the communication management system 50. The HDD 505 controls read and write of various kinds of data on the HD 504 under the control of the CPU 501. The media drive 507 controls read and write (storage) of data on a recording medium 506 such as a flash memory. The display 508 displays various kinds of information such as a cursor, a menu, a window, characters, and an image. The network I/F 509 communicates data by using the communication network 2. The keyboard 511 includes a plurality of keys for inputting characters, numbers, instructions, and the like. The mouse 512 is used to, for example, select and execute instructions, select a processing object, and move the cursor. The CD-ROM drive 514 controls read and write of various kinds of data on a CD-ROM 513 that is an example of an attachable recording medium. The bus line 510 such as an address bus and a data bus electrically connects the constituent elements with one another as illustrated in FIG. 4.

FIG. 5 illustrates a hardware configuration of the telephone terminal 70. As illustrated in FIG. 5, the telephone terminal 70 includes a CPU 701, a ROM 702, a RAM 703, an EEPROM 704, a CMOS sensor 705, acceleration and direction sensors 706, and a media drive 708. The CPU 701 controls the overall operation of the telephone terminal 70. The ROM 702 stores therein a basic input-output program. The RAM 703 is used as a work area for the CPU 701. The EEPROM 704 reads and writes data under the control of the CPU 701. The CMOS sensor 705 captures an image of a subject under the control of the CPU 701 to obtain image data. The acceleration and direction sensors 706 such as an electromagnetic compass that detects geomagnetism, a gyrocompass, and an accelerometer. The media drive 708 controls read and write (storage) of data on a recording medium 707 such as a flash memory. The recording medium 707, from which data is read and in which new data is written and stored under the control of the media drive 708, is constructed to be attachable and detachable.

The EEPROM 704 stores therein an operating system (OS) executed by the CPU 701, other computer programs, and various kinds of data. As long as an image of the subject can be captured, a CCD sensor may be used instead of the CMOS sensor 705, for example. The CCD sensor is a charge-coupled device that converts light into electric charge to generate an electronic image of a subject.

The telephone terminal 70 also includes a sound input unit 711, a sound output unit 712, an antenna 713a, a communication circuit 713, a global positioning system (GPS) reception unit 714, a display 715, a touch panel 716, and a bus line 710. The sound input unit 711 converts sound into a sound signal. The sound output unit 712 converts the sound signal into sound. The communication circuit 713 performs communication with a nearby base station 8a by using wireless communication signals via the antenna 713a. The GPS reception unit 714 receives a GPS signal from a GPS satellite 999. The display 715 such as a liquid crystal display or an organic EL display displays an image of a subject, icons, and/or the like. The touch panel 716 is mounted on the display 715, includes a pressure-sensitive panel or an electrostatic panel, and detects a touch point of a touch operation by a finger, a stylus, or the like on the display 715. The bus line 710 such as an address bus and data bus electrically connects the above-described constituent elements with one another.

The telephone terminal 70 also includes a dedicated battery 717, and the telephone terminal 70 is driven by the battery 717. The sound input unit 711 includes a microphone that receives sound, and the sound output unit 712 includes a speaker that outputs sound.

FIG. 6 illustrates a software configuration of the telephone terminal 10. As illustrated in FIG. 6, an OS 1020 and the communication app A1 run on a work area 1010 of the RAM 103. The OS 1020 is a basic software program that provides a basic function and manages the overall operations of the telephone terminal 10. The communication app A1 is an application program for a telephone call with other telephone terminals.

Figure 7:
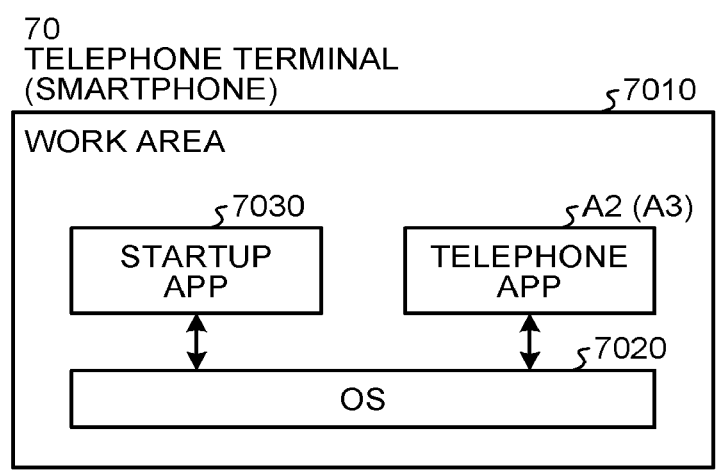
FIG. 7 illustrates a software configuration of the telephone terminal 70.

FIG. 7 illustrates a software configuration of the telephone terminal 70. As illustrated in FIG. 7, an OS 7020 and the communication app A2 (or A3) run on a work area 7010 of the RAM 703. The OS 7020 is a basic software program that provides a basic function and manages the overall operations of the telephone terminal 70. The communication app (A2, A3) is an application program for a telephone call with other telephone terminals. The communication app A2 is installed on the telephone terminal 70a, and the communication app A3 is installed on the telephone terminal 70b.

The communication apps A1, A2, and A3 are based on different communication protocols and are provided by different app providers.

Examples of communication protocols of the communication apps (A1, A2, A3) include (1) session initiation protocol (SIP), (2) H.323, (3) a protocol that is an extension to SIP, (4) a protocol of an instant messenger, (5) a protocol using a message method of SIP, (6) a protocol for the Internet relay chat (IRC), and (7) a protocol that is an extension to the protocol of an instant messenger. Examples of (4) the protocol of an instant messenger include (4-1) the extensible messaging and presence protocol (XMPP) and (4-2) protocols used, for example, in ICQ (registered trademark), AIM (registered trademark), and Skype (registered trademark). Examples of (7) the protocol that is an extension to the protocol of an instant messenger include Jingle.

Functional Configuration of Embodiment

Figure 8:
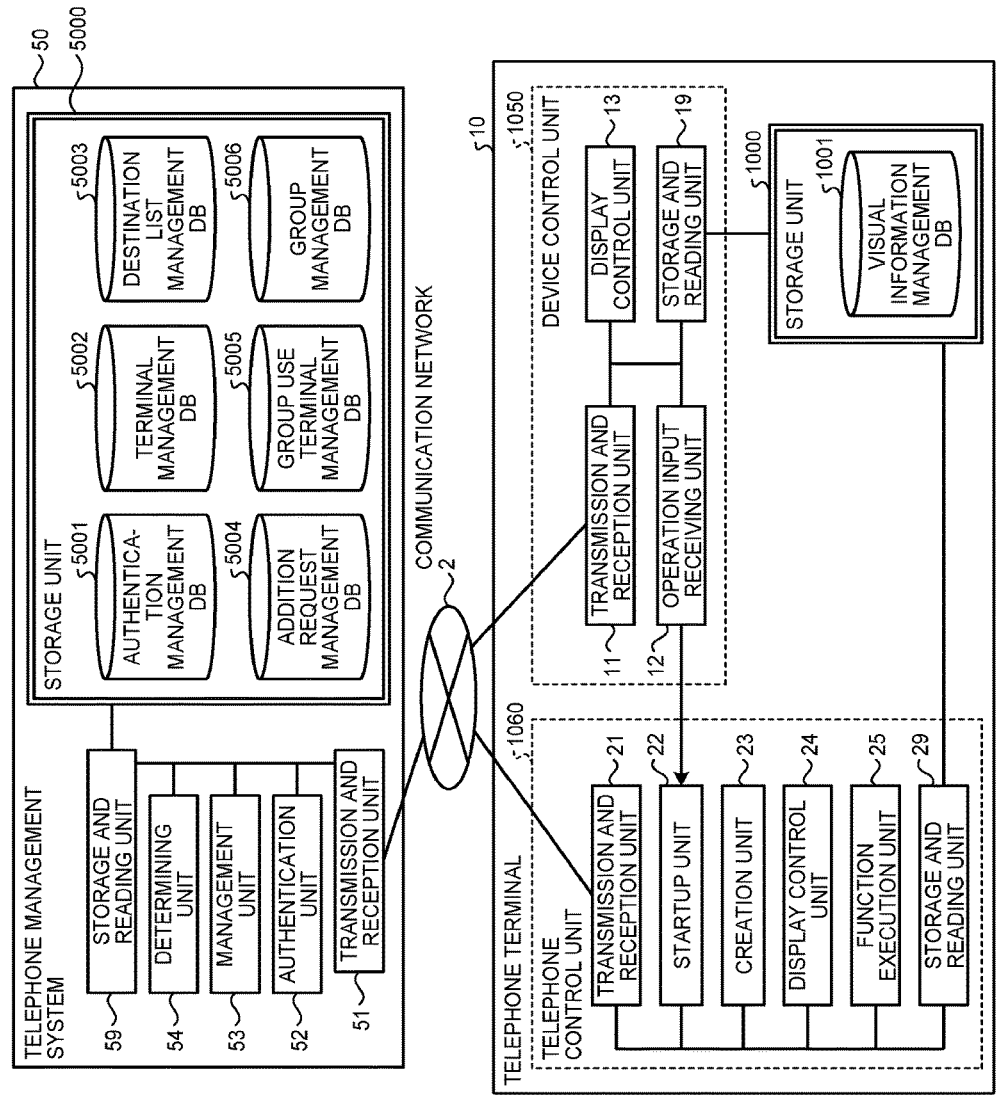
FIG. 8 is a functional block diagram of the telephone terminal (10, 70) and the telephone management system.

Described next is the functional configuration of the present embodiment. FIG. 8 is a functional block diagram of the telephone terminal 10 and the telephone management system 50 that constitute a part of the telephone system 1 according to the present embodiment. In FIG. 8, the telephone terminal 10 and the telephone management system 50 are connected with each other via the communication network 2 to perform data communication. The functional configuration of the telephone terminal 70 is the same with respect to the configuration illustrated in FIG. 8, and thus the description thereof is omitted.

Functional Configuration of Telephone Terminal

The telephone terminal 10 includes a device control unit 1050 and a telephone control unit 1060. The device control unit 1050 is implemented by execution of the OS 1020 illustrated in FIG. 6. The telephone control unit 1060 is implemented by starting the communication app A1 illustrated in FIG. 6.

The device control unit 1050 includes a transmission and reception unit 11, an operation input receiving unit 12, a display control unit 13, and a storage and reading unit 19. These units are functions each implemented by a certain constituent element illustrated in FIG. 3 operated by an instruction from the CPU 101 in accordance with a computer program loaded on the RAM 103 from the flash memory 104.

The telephone control unit 1060 includes a transmission and reception unit 21, a startup unit 22, a creation unit 23, a display control unit 24, a function execution unit 25, and a storage and reading unit 29. These units are functions each implemented by a certain constituent element illustrated in FIG. 5 operated by an instruction from the CPU 101 in accordance with a computer program loaded on the RAM 103 from the flash memory 104.

The telephone terminal 10 also includes a storage unit 1000 including the ROM 102, the RAM 103, and the flash memory 104 illustrated in FIG. 3. The storage unit 1000 includes a visual information management data base (DB) 1001 including a visual information management table to be described later.

Visual Information Management Table

FIG. 9 is a schematic diagram of the visual information management table. The visual information management table manages operating condition information that indicates an operating condition of a destination candidate that can be a destination terminal in association with visual information data of the operating condition displayed on a destination list. The visual information is, for example, icons illustrated in FIG. 9. The visual information constituting the visual information management table may be sent from the telephone management system 50 when a communication terminal requesting to start communication (hereinafter referred to as a "start request source terminal") requests a login at Step S2 to be described later, or may be stored in the storage unit 1000 before the factory shipment of the start request source terminal. The operating condition information includes four types of information that are online (possible to call), online (now talking), online (temporarily suspended), and offline.

Functional Configuration of Device Control Unit

With reference to FIG. 8, the functional configuration of the device control unit 1050 of the telephone terminal 10 is specifically described. The description of the functional configuration of the device control unit 1050 of the telephone terminal 10 includes the relation between the functional configuration of the device control unit 1050 of the telephone terminal 10 and main constituent elements of the constituent elements illustrated in FIG. 3 that implement the functional configuration of the device control unit 1050.

The transmission and reception unit 11 of the telephone terminal 10 illustrated in FIG. 8 is implemented by an instruction from the CPU 101 and by the network I/F 111 illustrated in FIG. 3, and transmits and receives data (or information) to and from, for example, a terminal, a device, and a system on the opposite side via the communication network 2.

The operation input receiving unit 12 is implemented by an instruction from the CPU 101 illustrated in FIG. 3 and by the operating buttons (108*a*, 108*b*, 108*c*, 108*d*, 108*e*) and the power switch 109 illustrated in FIG. 2, and receives various kinds of inputs and selections from a user. When, for example, the user turns on the power switch 109 illustrated in FIG. 2, the operation input receiving unit 12 illustrated in FIG. 8 receives the turn-on operation and turns on the power.

The display control unit 13 is implemented by an instruction from the CPU 101 and by the display I/F 117 illustrated in FIG. 3, and controls transmission of image data transmitted from the opposite terminal to the display 120 during the telephone call.

The storage and reading unit 19 is implemented by an instruction from the CPU 101 and by the SSD 105 illustrated in FIG. 3 or by an instruction from the CPU 101, and stores various kinds of data in the storage unit 1000 and reads the data stored in the storage unit 1000.

Functional Configuration of Telephone Control Unit

With reference to FIGS. 3 and 8, the functional configuration of the telephone control unit 1060 of the telephone terminal 10 is specifically described. The description of the functional configuration of the telephone control unit 1060 of the telephone terminal 10 includes the relation between the functional configuration of the telephone control unit 1060 of the telephone terminal 10 and main constituent elements of the constituent elements illustrated in FIG. 3 that implement the functional configuration of the telephone control unit 1060.

The transmission and reception unit 21 illustrated in FIG. 8 is implemented by an instruction from the CPU 101 and by the network I/F 111 illustrated in FIG. 3, and transmits and receives data (or information) to and from a terminal, a device, a system, or the like on the opposite side via the communication network 2.

The startup unit 22 is implemented by an instruction from the CPU 101 illustrated in FIG. 3 and starts the operation of the telephone control unit 1060 (communication app) on the basis of a start request from the operation input receiving unit 12 of the device control unit 1050 when the operation input receiving unit 12 receives a selection operation of the app from the user.

The creation unit 23 is implemented by an instruction from the CPU 101 illustrated in FIG. 3 and creates a destination list screen by putting destination condition information to be described later and the above-described visual information in a destination list frame (an example of an execution image frame data) to be described later.

The display control unit 24 is implemented by an instruction from the CPU 101 and by the display I/F 117 illustrated in FIG. 3, and controls transmission of data of the destination list screen created by the creation unit 23 to the display 120.

The function execution unit 25 is implemented by an instruction from the CPU 101 and by, for example, the camera 112, the microphone 114, or the speaker 115 illustrated in FIG. 3, and controls implementation of a telephone call by, for example, images and sounds.

The storage and reading unit 29 is implemented by an instruction from the CPU 101 and by the SSD 105 illustrated in FIG. 3 or implemented by an instruction from the CPU 101, and stores various kinds of data in the storage unit 1000 and reads the data stored in the storage unit 1000.

Functional Configuration of Telephone Management System

The telephone management system 50 includes a transmission and reception unit 51, an authentication unit 52, a management unit 53, a determining unit 54, and a storage and reading unit 59. These units are functions or means each implemented by a certain constituent element illustrated in FIG. 4 operated by an instruction from the CPU 501 in accordance with a computer program for the telephone management system 50 loaded on the RAM 203 from the HD 204. The telephone management system 50 also includes a storage unit 5000 including the HD 504 illustrated in FIG. 6. The storage unit 5000 includes DBs (5001, 5002, 5003, 5004, 5005, 5006) including respective tables described below.

Terminal Authentication Management Table

FIG. 10 is a schematic diagram of an authentication management table. The storage unit 5000 includes an authentication management DB 5001 including the authentication management table illustrated in FIG. 10. The authentication management table manages authentication passwords in association with terminal IDs of all the telephone terminals (10, 70) managed by the telephone management system 50. For example, the authentication management table illustrated in FIG. 10 indicates that a terminal ID of the terminal 10*aa* is "01aa" and its password is "aaaa".

Terminal Management Table

FIG. 11 is a schematic diagram of a terminal management table. The storage unit 5000 includes a terminal management DB 5002 including the terminal management table illustrated in FIG. 11. The terminal management table manages the terminal ID of the terminal 10 in association with the terminal name of the terminal 10 as a destination, an operating condition of the terminal 10, a reception date and time at which the telephone management system 50 received login request information to be described later from the terminal 10, and the IF address of the terminal 10. For example, the terminal management table illustrated in FIG. 11 indicates that the terminal ID "01aa" of the telephone terminal 10*aa* is associated with the terminal name "Japan Tokyo office, AA terminal", the operating condition "online (possible to call)", the reception date and time at which the telephone management system 50 received the login request information "November 1st, 2013, 13:40", and the IP address of the terminal 10aa "1.2.1.3". The terminal ID, the terminal type, and the terminal name are stored and managed when the terminal 10 is registered in the telephone management system 50 to perform communication by using the telephone system 1.

Destination List Management Table

FIG. 12 is a schematic diagram of a destination list management table. The storage unit 5000 includes a destination list management DB 5003 including the destination list management table illustrated in FIG. 12. The destination list management table manages the terminal ID of a start request source terminal that requests to start a telephone call, in association with terminal IDs of all the destination terminals registered as destination candidates that can be a destination terminal. For example, the destination list management table illustrated in FIG. 12 indicates that the start request source terminal (terminal 10aa) having the terminal ID "01aa" can request to start a telephone call to destination candidates such as the telephone terminal 10ab having the terminal ID "01ab" and the telephone terminal 10ac having the terminal ID "01ac". In the telephone management system 50, the destination candidates are updated by adding a new destination candidate or eliminating an existing destination candidate.

Addition Request Management Table

FIG. 13 is a schematic diagram of an addition request management table. The storage unit 5000 includes an addition request management DB 5004 including the addition request management table illustrated in FIG. 13. The addition request management table manages the terminal ID of a telephone terminal that requests to add a destination candidate (hereinafter referred to as an "addition request source terminal"), in association with the terminal ID of a telephone terminal that is requested to be added as the destination candidate (hereinafter referred to as an "addition request target terminal"). This configuration can manage which telephone terminal is requesting which telephone terminal as a new destination candidate.

Group Use Terminal Management Table

FIG. 14 is a schematic diagram of a group use terminal management table. The storage unit 5000 includes a group use terminal management DB 5005 including the group use terminal management table illustrated in FIG. 14. The group use terminal management table manages a group ID (an example of group identification information) for identifying a group in association with terminal IDs for identifying telephone terminals (10, 70) included in the same group. For example, the group use terminal management table illustrated in FIG. 14 indicates that a group G1 having a group ID "g01" includes telephone terminals having terminal IDs "01aa, 01ab, . . . ".

Group Management Table

FIG. 15 is a schematic diagram of a group management table. The storage unit 5000 includes a group management DB 5006 including the group management table illustrated in FIG. 15. The group management table manages a group ID of a group to which the addition request source terminal that is an addition request source requesting to add a destination candidate belongs, in association with a group name of the group, and a group ID for identifying a group to which the addition request target terminal that is an addition request target being able to become the destination candidate belongs.

The "group" according to the present embodiment indicates a unit of service that a user receives when the user uses the communication platform including the telephone management system 50. Examples of group names include the following three types: "special (charged)"; "standard (charged)"; and "free". The group name "special (charged)" indicates a group of users of the telephone terminals (10, 70) who are special members paying an expensive rate for the communication service using the communication network 2 including the telephone management system 50. The group name "standard (charged)" indicates a group of users who are standard members paying a standard rate for the communication service described above. The group name "free" indicates a group of users who are guest members with no charge for the communication service described above. The rates for the communication service are different from the communication charges paid by the users who use communication services provided by application service providers (APS) and mobile phone carriers, but are paid by the users for the application provision by vendors as application providers.

For example, the group management table illustrated in FIG. 15 indicates that a group having the group ID "g01" has the group name "special (charged)" and can make an addition request to groups having the group IDs "g01, g02, and g03". In accordance with the group management table, when the telephone management system 50 receives an addition request for adding a destination candidate from an addition request source terminal belonging to a group G1 having the group ID "g01", the telephone management system 50 transmits an addition approval request to an addition request target terminal belonging to any one of groups (G1, G2, G3) indicated by the three types of group IDs "g01, g02, g03". The telephone management system 50, however, does not transmit the addition approval request to an addition request target terminal belonging to a group other than the groups (G1, G2, G3) indicated by the three types of group IDs "g01, g02, g03".

According to the group management table illustrated in FIG. 15, when the telephone management system 50 receives an addition request from an addition request source terminal belonging to the group G2 indicated by the group ID "g02", the telephone management system 50 does not transmit the addition approval request to an addition request target terminal belonging to the group G1 indicated by the group ID "g01". On the contrary, when the telephone management system 50 receives an addition request from an addition request source terminal belonging to the group G1 indicated by the group ID "g01", the telephone management terminal 50 transmits the addition approval request to an addition request target terminal belonging to the group G2 indicated by the group ID "g02". With a rule or a policy as described above, the special members receive a clear benefit compared to the members of the other groups.

How the telephone terminals are classified into groups is not necessarily based on members as described above, but for example, the telephone terminals may be classified into groups on the basis of app providers (vendors) providing applications used by the telephone terminals, or on the basis of apps that the telephone terminals (10, 70) use.

Functional Configuration of Telephone Management System

The transmission and reception unit 51 is implemented by an instruction from the CPU 501 illustrated in FIG. 4 and by the network I/F 509 illustrated in FIG. 4, and transmits and receives various kinds of data (or information) to and from the telephone terminals, devices, and systems via the communication network 2.

The authentication unit 52 is implemented by an instruction from the CPU 301 illustrated in FIG. 4, and searches the authentication management table (see FIG. 10) by using a terminal ID and a password received by the transmission and reception unit 51 as a search key and determines whether the same terminal ID and password are managed in the authentication management table to authenticate a telephone terminal.

The management unit 53 is implemented by an instruction from the CPU 301 illustrated in FIG. 4, and stores and manages the terminal ID and the terminal name of each telephone terminal (10, 70) in association with an operating condition of the telephone terminal (10, 70), a reception date and time at which the telephone management system 50 received a login request, and the IP address of the telephone terminal (10, 70) in the terminal management table (see FIG. 11).

The determining unit 54 determines, when a group ID (an example of first group identification information) read by the storage and reading unit 59 is a group ID for an addition request source terminal in the group management table (see FIG. 15), whether a group ID (an example of second group identification information) read by the storage and reading unit 59 is included in corresponding group IDs for addition request target terminals in the group management table.

The storage and extraction unit 39 is implemented by an instruction from the CPU 301 and the HDD 305 illustrated in FIG. 4 or implemented by an instruction from the CPU 301, and stores various kinds of data in the storage unit 3000 and extracts the data stored in the storage unit 3000.

Processing or Operation of Embodiment

Figure 16:
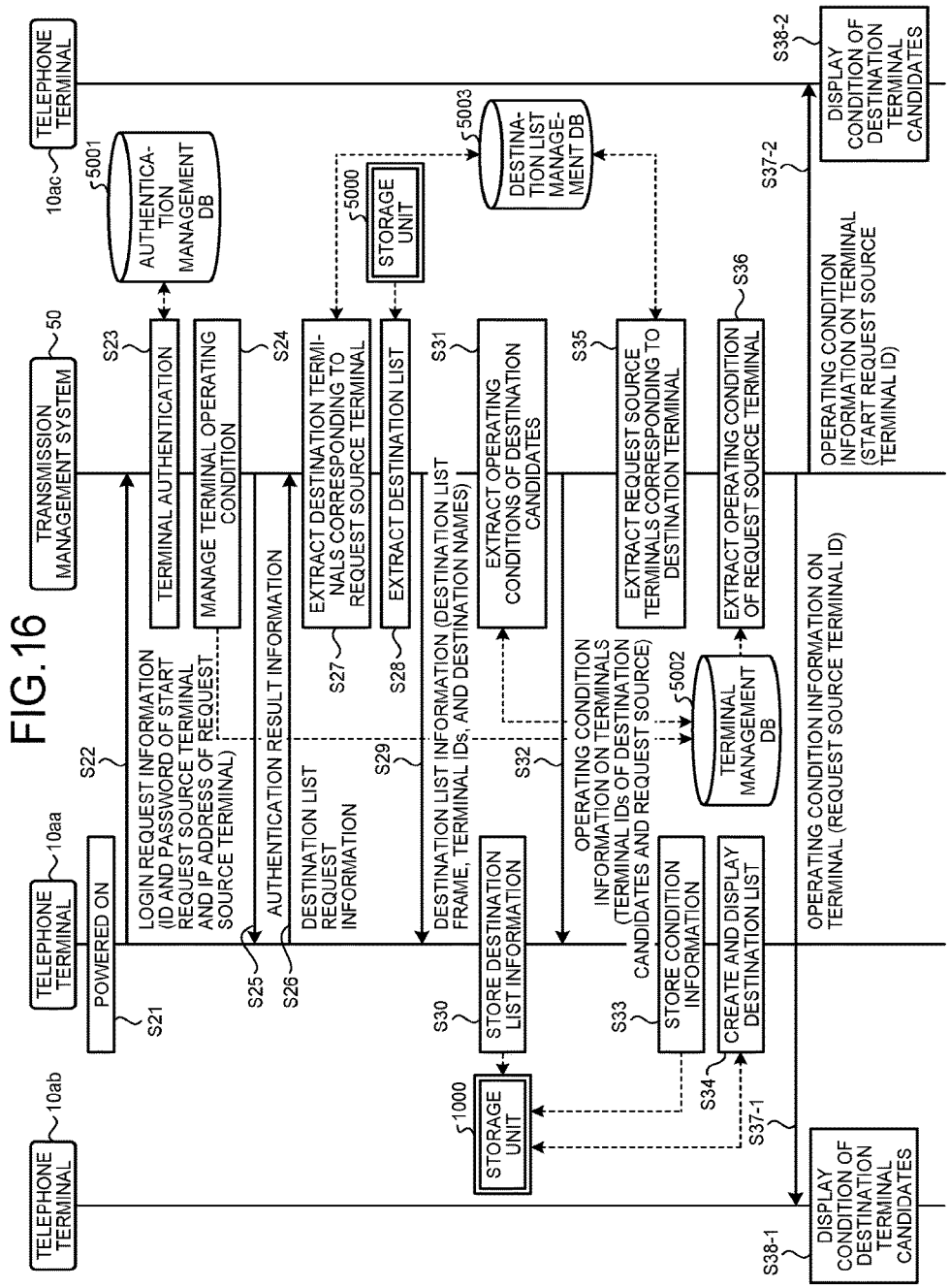
FIG. 16 is a sequence diagram illustrating processing in preparatory phase for starting a telephone call between telephone terminals.

Described next is processing performed in the present embodiment with reference to FIGS. 16 to 23. Described first is processing of transmitting and receiving management information in preparation for starting a telephone call by the telephone terminal 10aa as a start request source terminal that requests to start a telephone call with reference to FIGS. 16 and 17. FIG. 16 is a sequence diagram illustrating processing in preparatory phase for starting a telephone call between telephone terminals. FIG. 17 is a schematic diagram of an addition approval request screen. In FIG. 16, various kinds of management information are transmitted and received under a management information session "sei". The following description begins with processing after authentication for the telephone terminal 10aa as a device is completed.

When a user operates an operating button (108a to 108e) illustrated in FIG. 2, the operation input receiving unit 12 of a start request source terminal (telephone terminal 10aa) instructs the startup unit 22 of the telephone control unit 1060 to start, and the telephone control unit 1060 is started (Step S21).

The transmission and reception unit 21 of the telephone control unit 1060 transmits login request information indicating a login request to the telephone management system 50 via the communication network 2 (Step S22). The login request information includes a terminal ID and a password for identifying the telephone terminal 10aa. The terminal ID and the password are read from the storage unit 1000 via the storage and reading unit 19 and transmitted to the transmission and reception unit 11. The terminal ID and the password may be read from an external recording medium via the storage and reading unit 19 or may be input to the telephone terminal by the user. When the login request information is transmitted from the telephone terminal 10aa to the telephone management system 50, the telephone management system 50 at the receiving side can receive the IP address of the telephone terminal 10aa at the transmitting side.

The authentication unit 52 of the telephone management system 50 searches the authentication management DB 5001 (see FIG. 10) in the storage unit 5000 by using the terminal ID and the password, as a search key, included in the login request information received via the transmission and reception unit 51, and determines whether the same terminal ID and password are managed in the authentication management DB 5001 to authenticate the terminal (Step S23). If the authentication unit 52 determines that the same terminal ID and password are managed and thus determines that the login request is transmitted from a telephone terminal 10 on which an app is installed with a proper use right, the management unit 53 stores, in each record indicated by the terminal ID and the terminal name of the telephone terminal 10aa in the terminal management DB 5002 (see FIG. 11), the operating condition, the reception date and time at which the above login request information was received, and the IP address of the telephone terminal 10aa in association with each other (Step S24). Consequently, the terminal management table manages the terminal ID "01aa", the operating condition "online (possible to call)", the reception date and time "Nov. 1, 2013, 13:40", and the IP address "1.2.1.3" in association with each other.

The transmission and reception unit 51 of the telephone management system 50 transmits, via the communication network 2, authentication result information indicating an authentication result obtained at the authentication unit 52 to the start request source terminal (telephone terminal 10aa) that has requested a login (Step S25). In the present embodiment, the following describes a case in which the authentication unit 52 determines that the telephone terminal has a proper use right.

When the transmission and reception unit 21 of the request source terminal (telephone terminal 10aa) receives the authentication result information indicating that the request source terminal is determined to have the proper use right, the transmission and reception unit 21 transmits destination list request information indicating that a destination list is requested, to the telephone management system 50 via the communication network 2 (Step S26). The transmission and reception unit 51 of the telephone management system 50 receives the destination list request information.

The storage and reading unit 59 searches the destination list management DB 5003 (see FIG. 12) by using the terminal ID "01aa" of the request source terminal (telephone terminal 10aa) that has requested a login as a search key, reads terminal IDs of destination candidates to which the request source terminal (terminal 10aa) can make a telephone call, and reads terminal names corresponding to the terminal IDs from the terminal management DB 5002 (see FIG. 11) (Step S27). At Step S27, the storage and reading unit 59 extracts terminal IDs ("01ab", etc.) of destination candidates (10ab, etc.) corresponding to the terminal ID "01aa" of the request source terminal (telephone terminal 10aa) and the corresponding terminal names (Japan Tokyo office, AB terminal, etc.).

The transmission and reception unit 51 of the telephone management system 50 reads data of a destination list frame from the storage unit 5000 via the storage and reading unit 59 (Step S28), and transmits "destination list information (destination list frame, terminal ID, terminal name)" including the destination list frame and the terminal IDs and the terminal names read by the storage and reading unit 59 to the start request source terminal (telephone terminal 10aa) (Step S29). The transmission and reception unit 21 of the start request source terminal (telephone terminal 10aa) receives the destination list information, and the storage and reading unit 29 stores the destination list information in the storage unit 1000 (Step S30).

In the present embodiment, as described above, each telephone terminal 10 does not manage the destination list information, but the telephone management system 50 manages the destination list information of all the telephone terminals. Even when a new telephone terminal 10 is included in the transmission system 1, a telephone terminal 10 of a new model is included instead of a telephone terminal 10 already included in the system, or the design or the like of the destination list frame is changed, the telephone management system 50 collectively deals with these, and thus the layer for changing the destination list information on their telephone terminals 10 can be saved.

The storage and reading unit 54 of the telephone management system 50 searches the terminal management DB 5002 (see FIG. 11) by using the terminal IDs ("01ab", etc.) of the read destination candidates as a search key, and reads corresponding operating conditions of the respective terminal IDs to acquire the operating conditions of the telephone terminals (10ab, etc.) as destination candidates (Step S31).

The transmission and reception unit 51 transmits "terminal operating condition information" including a terminal ID used as a search key at Step S27 and an operating condition of the corresponding destination terminal to the start request source terminal (telephone terminal 10aa) via the communication network 2 (Step S32).

The storage and reading unit 29 of the start request source terminal (telephone terminal 10aa) stores the terminal operating condition information received from the telephone management system 50 in the storage unit 1000 sequentially (Step S33). Consequently, by receiving the condition information of the telephone terminals, the start request source terminal (telephone terminal 10aa) can acquire current operating conditions of the destination candidates such as the telephone terminal 10ab to which the start request source terminal (telephone terminal 10aa) can make a telephone call.

The creation unit 23 of the start request source terminal (telephone terminal 10aa) creates a destination list that reflects the conditions of the telephone terminals 10 as destination candidates on the basis of the destination list information and the terminal condition information stored in the storage unit 1000, and the display control unit 24 controls the timing at which the destination list is displayed on the display 120 illustrated in FIG. 5 (Step S34). The destination list illustrated in FIG. 17 includes icons indicating the operating conditions of the telephone terminals, and the icons indicate, from the top to the bottom, "online (possible to call)", "offline", "online (possible to call)", and "online (now talking)".

The storage and reading unit 59 of the telephone management system 50 searches the destination list management DB 5003 (see FIG. 12) on the basis of the terminal ID "01aa" of the start request source terminal (telephone terminal 10aa) that has requested a login to extract terminal IDs of other start request source terminals that register the terminal ID "01aa" of the start request source terminal (telephone terminal 10aa) as their destination candidate (Step S35). In the destination list management table illustrated in FIG. 12, the terminal IDs of the other start request source terminals to be read are, for example, "01ab" and "01ac".

The storage and reading unit 54 of the telephone management system 50 searches the terminal management DB 5002 (see FIG. 11) on the basis of the terminal ID "01aa" of the start request source terminal (telephone terminal 10aa) that has requested a login to acquire the operating condition of the start request source terminal (telephone terminal 10aa) that has requested a login (Step S36).

The transmission and reception unit 51 transmits the "terminal condition information" including the terminal ID "01aa" of the start request source terminal (telephone terminal 10aa) and its operating condition "online" acquired at Step S36 to telephone terminals (10ca, etc.) having operating condition "online" in the terminal management DB 5002 (see FIG. 11) out of the telephone terminals (10ab, 10ca, etc.) corresponding to the terminal IDs ("01ab", "01ca", etc.) extracted at Step S35 (Step S37). When the transmission and reception unit 51 transmits the terminal condition information to the telephone terminals (10ba, etc.), the transmission and reception unit 51 refers to the IP addresses of the telephone terminals managed in the terminal management table illustrated in FIG. 11 on the basis of the terminal IDs ("01ba", etc.). With this, the telephone management system 50 can transmit the terminal ID "01aa" and the operating condition "online" of the request source terminal (telephone terminal 10aa) that has requested a login, to destination terminals (10ca, etc.) that can make a telephone call to the request source terminal (telephone terminal 10aa) that has requested a login as their destination candidate. Consequently, a destination candidate (telephone terminal 10ac) can also display the condition of its destination candidate as illustrated in FIG. 17 (Step S38). FIG. 16 only illustrates processing on the telephone terminal 10ac to make explanation easier. The telephone management system 50 also performs the same processing as that performed at Step S21 to S38 described above on other telephone terminals 10, and the description thereof is omitted.

Figure 18:
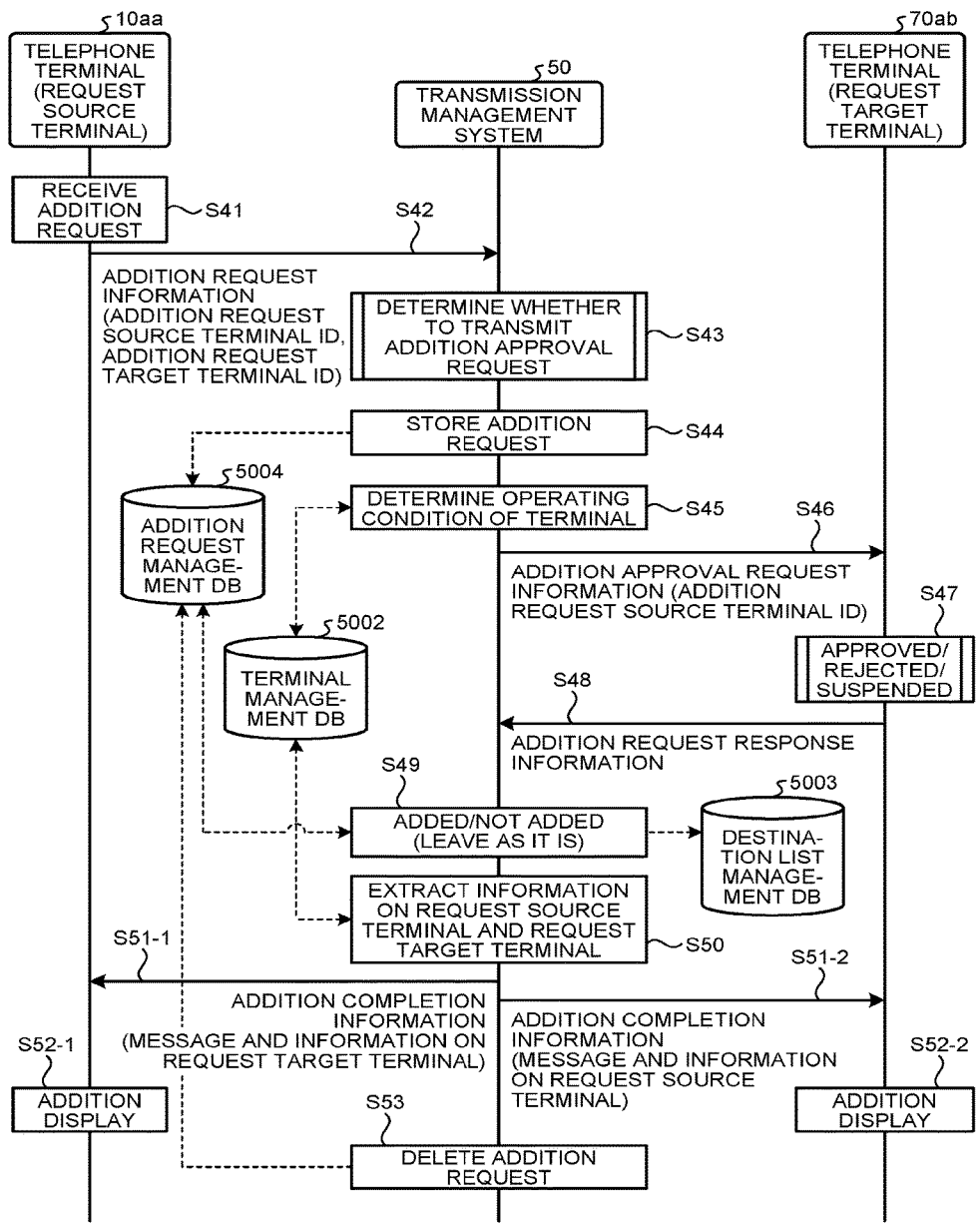
FIG. 18 is a sequence diagram illustrating processing of adding a destination candidate.
Figure 19:
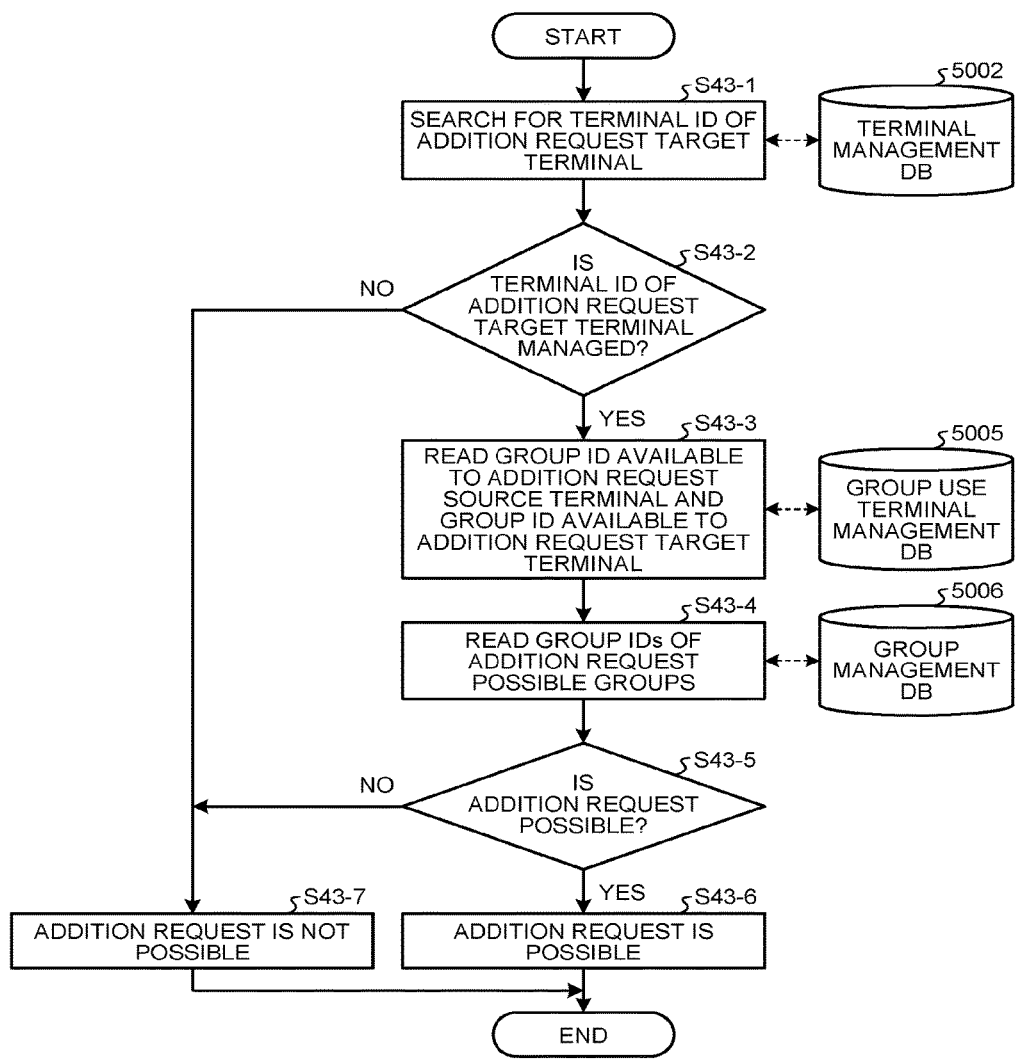
FIG. 19 is a flowchart illustrating the procedure for determining whether to transmit an addition approval request.
Figure 20:
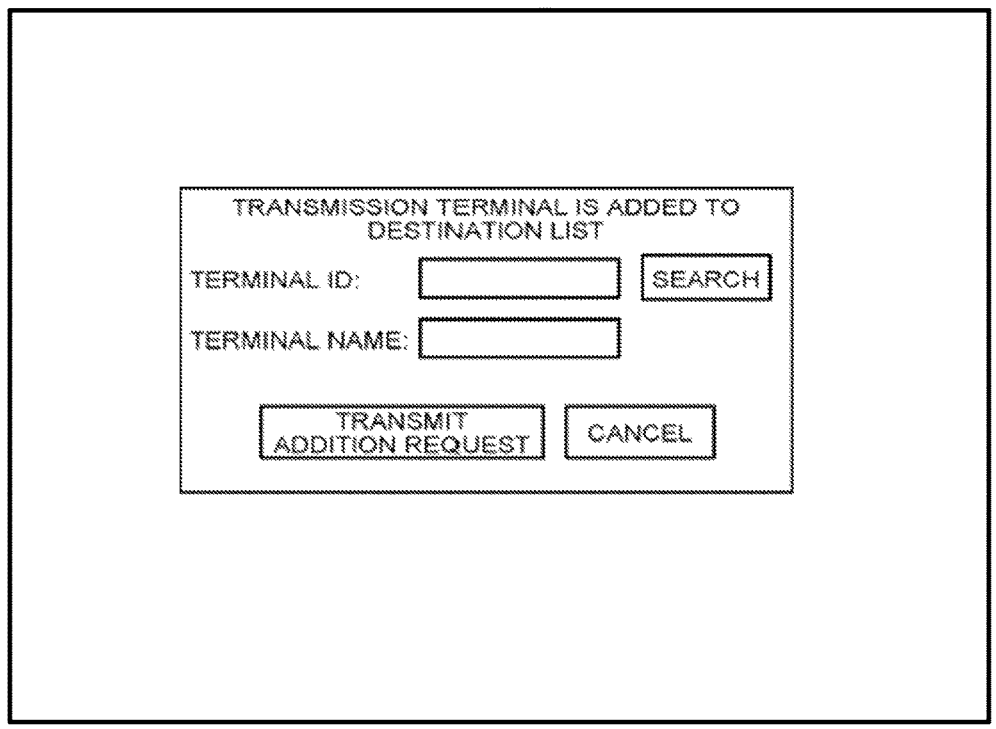
FIG. 20 is a schematic diagram of an addition request reception screen.
Figure 21:
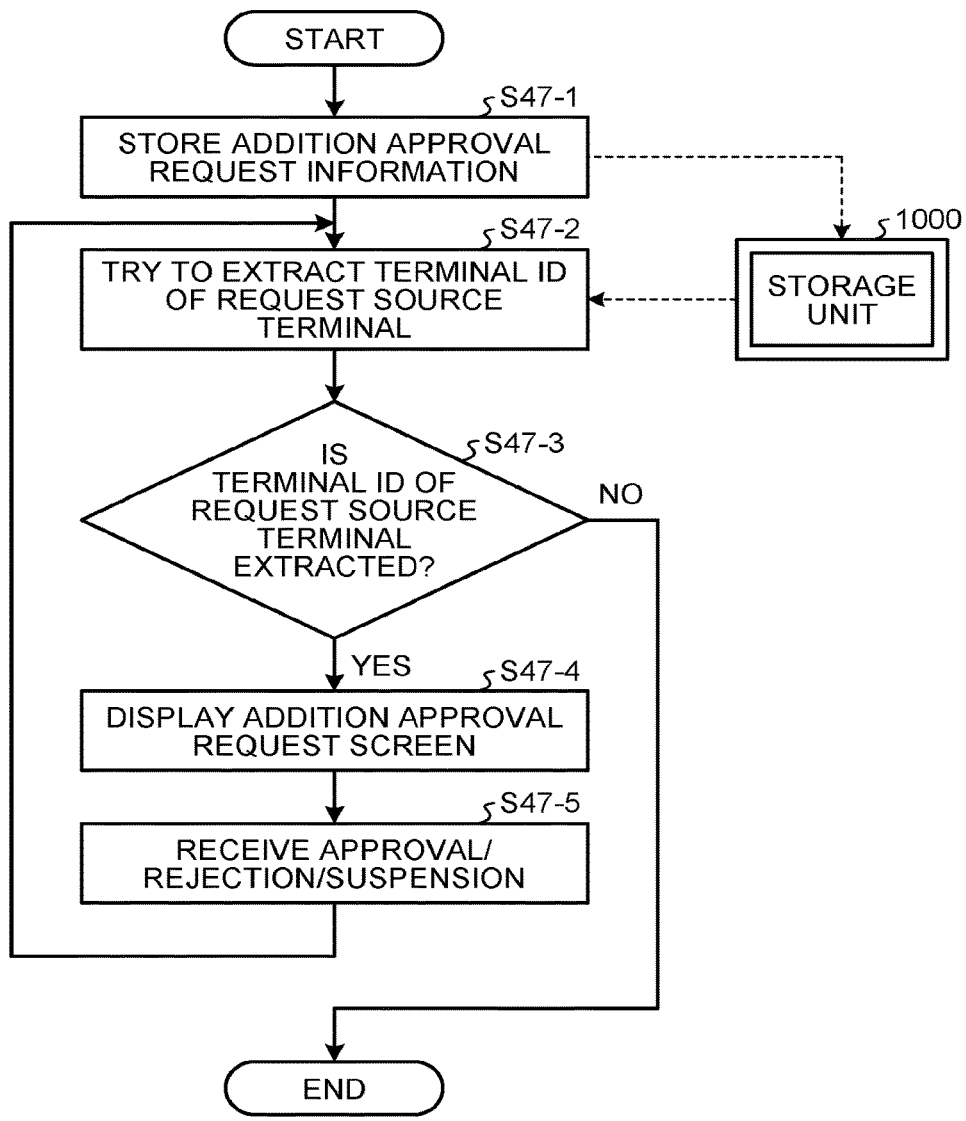
FIG. 21 is a flowchart illustrating the procedure for determining approval or rejection.
Figure 22:
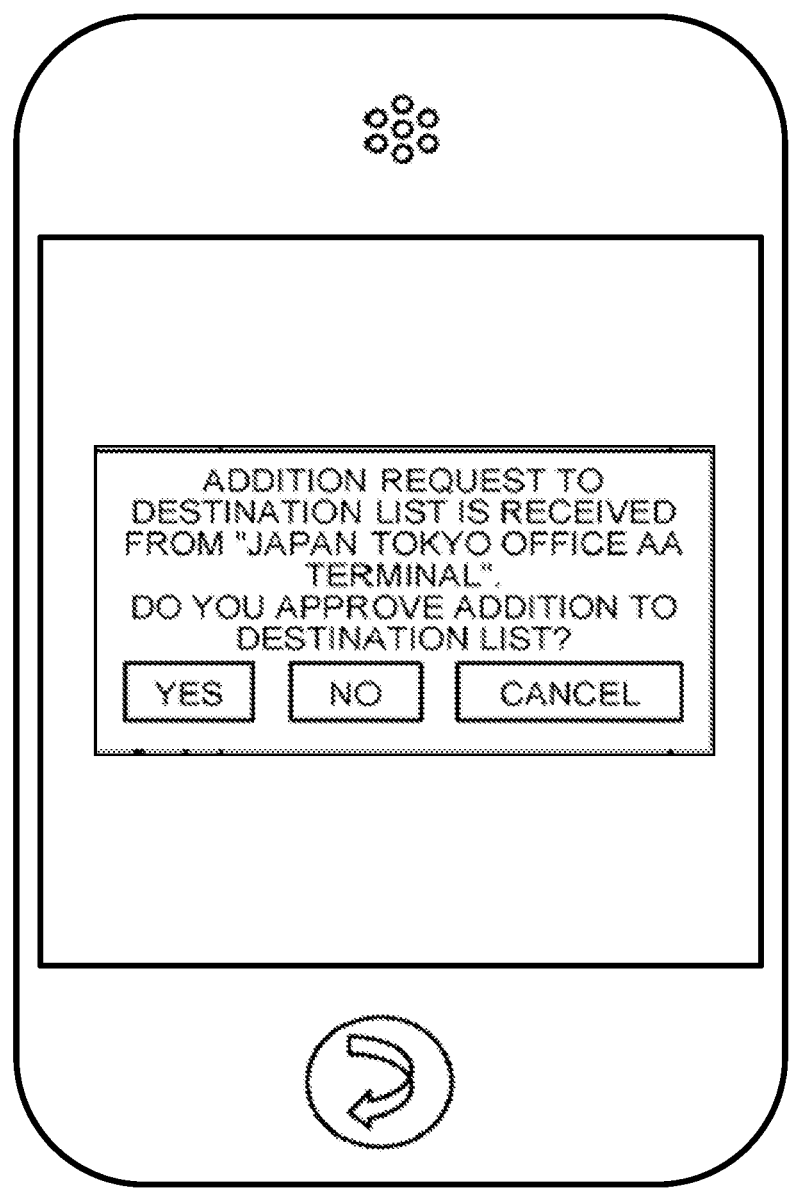
FIG. 22 is a schematic diagram of an addition approval request screen.
Figure 23:
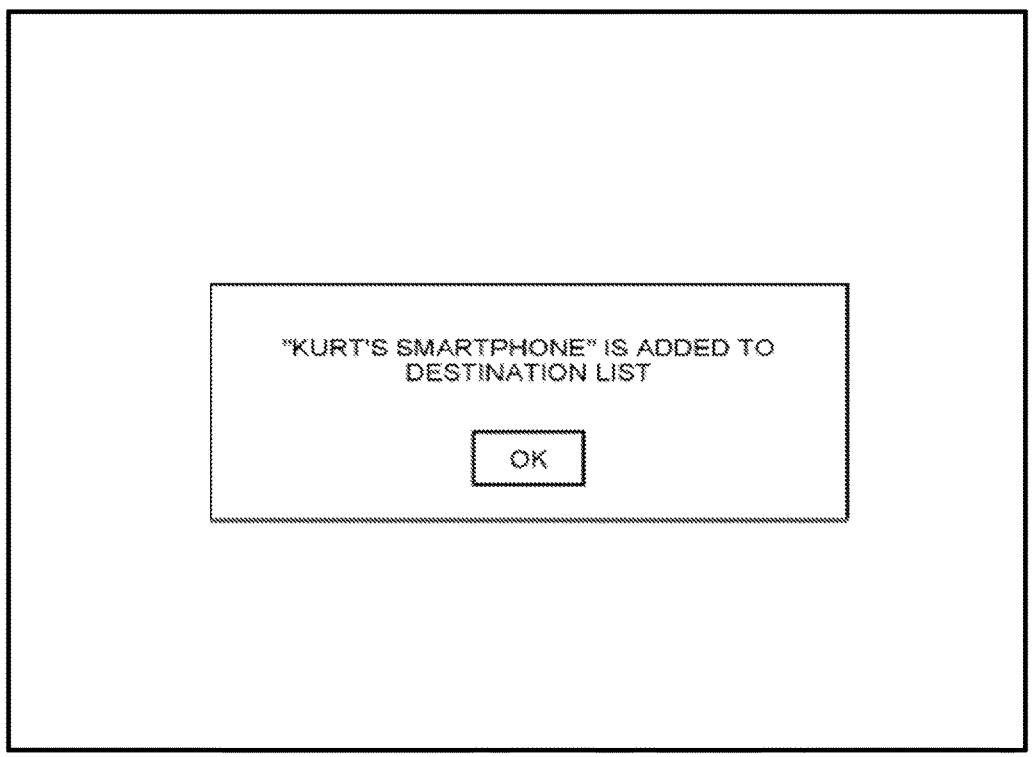
FIG. 23 is a schematic diagram of an addition completion screen.

With reference to FIGS. 18 to 23, processing of adding a destination candidate is described. The present embodiment describes a case in which an addition request source terminal (telephone terminal 10aa) requests to add an addition request target terminal (telephone terminal 10dc) to the destination list of the addition request source terminal. FIG. 18 is a sequence diagram illustrating processing of adding a destination candidate. FIG. 19 is a flowchart illustrating the procedure for determining whether to transmit an addition approval request. FIG. 20 is a schematic diagram of an addition request reception screen. FIG. 21 is a flowchart illustrating the procedure for determining approval or rejection. FIG. 22 is a schematic diagram of an addition approval request screen. FIG. 23 is a schematic diagram of an addition completion screen.

A user of the addition request source terminal (telephone terminal 10aa) pushes an "add destination" button indicated in the lower right of the destination list illustrated in FIG. 17 by operating, for example, the operating button 108d, and the operation input receiving unit 12 receives the push operation and the display control unit 24 displays data of an addition request reception screen stored in the storage unit 1000 on a display 120aa. The operation input receiving unit 12 thus receives an addition request of a destination candidate (Step S41). The addition request reception screen is displayed over the destination list as illustrated in FIG. 20.

The user inputs a terminal ID or a terminal name of a telephone terminal (in this case, the user inputs the terminal ID "07ab") that the user wants to add as a destination candidate by using, for example, the operating button 108d in the addition request reception screen illustrated in FIG. 20, and pushes a "transmit addition request" button. By this operation, the operation input receiving unit 12 receives the input from the user, and the transmission and reception unit 11 of the addition request source terminal (telephone terminal 10aa) transmits addition request information indicating an addition request of a destination candidate to the telephone management system 50 via the communication network 2 (Step S42). The addition request information includes the terminal ID "01aa" of the addition request source terminal (telephone terminal 10aa) for identifying the addition request source terminal and the terminal ID "07ab" of an addition request target terminal (telephone terminal 70ab) for identifying the addition request target terminal. The transmission and reception unit 51 of the telephone management system 50 receives the addition request information.

The telephone management system 50 determines whether to transmit addition approval request information to the addition request target terminal (telephone terminal 70ab) (Step S43). The processing at Step S43 is more specifically described with reference to FIG. 19.

As illustrated in FIG. 19, the storage and reading unit 59 searches the terminal management DB 5002 by using the terminal ID of the addition request target terminal received at Step S42 as a search key (Step S43-1). The determining unit 54 determines whether the terminal ID of the addition request target terminal is managed by the terminal management DB (Step S43-2). If the determining unit 54 determines that the terminal ID of the addition request target terminal is managed by the terminal management DB (Yes at Step S43-2), the storage and reading unit 59 searches the group use terminal management DB 5005 by using the terminal ID of the addition request source terminal and the terminal ID of the addition request target terminal received at Step S42 as a search key to read the group IDs corresponding to the respective terminal IDs (Step S43-3). The storage and reading unit 59 searches the group management DB 5006 by using the group ID of a group to which the addition request source terminal belongs read at Step S43-3 as a search key to read corresponding group IDs of groups to which telephone terminals to which the addition request source terminal can make an addition request belong (Step S43-4).

The determining unit 54 determines whether the group ID, read at Step S43-3, of a group to which the addition request target terminal belongs is included in the group IDs read at Step S43-4 (Step S43-5). If yes at S43-5, the determining unit 52 determines that the addition request is possible (Step S43-6). If not at S43-5, the determining unit 52 determines that the addition request is not possible (S43-7). If the determining unit 54 determines that the terminal ID of the addition request target terminal is not managed by the terminal management DB 5002 at S43-2, the determining unit 54 determines that the addition request is not possible at Step S43-7.

The following continues describing the case in which the addition request source terminal is determined to be able to make an addition request to the addition request target terminal at Step S43-6.

The description returns to processing illustrated in FIG. 18. The management unit 53 of the telephone management system 50 manages the received terminal ID "01aa" of the addition request source terminal by storing it in a new record of a terminal ID field for the request source terminal in the addition request management DB 5004 (see FIG. 13), and manages the terminal ID "07ab" of the addition request target terminal by additionally storing it in a terminal ID field for the addition request target terminal in the new record (Step S44).

The storage and reading unit 59 searches the terminal management DB 5002 (see FIG. 11) on the basis of the terminal ID "07dab" of the addition request target terminal, and the determining unit 54 determines the corresponding operating condition (Step S45). If the determining unit 54 determines that the operating condition of the addition request target terminal is online but the target terminal has not started a telephone call, the transmission and reception unit 51 transmits addition approval request information asking whether to approve the addition request to the addition request target terminal (terminal 70ab) (Step S46). The addition approval request information includes the terminal ID "01aa" of the addition request source terminal. With this, the transmission and reception unit 11 of the addition request target terminal (terminal 70ab) receives the addition approval request information.

The addition request target terminal (telephone terminal 70ab) determines whether to approve, reject, or suspend the addition request (Step S47). The processing at Step S47 is more specifically described with reference to FIGS. 21 and 22.

When the addition request target terminal (telephone terminal 70ab) receives the addition approval request information, the storage and reading unit 19 stores the information in the storage unit 1000 (Step S47-1). When the addition approval request information is transmitted one after another, the information is stored in the storage unit 1000 sequentially.

The storage and reading unit 19 tries to extract the terminal ID of the addition request source terminal included in the addition approval request information from the storage unit 1000 (Step S47-2). When the storage unit 1000 stores therein a plurality of pieces of addition approval request information, the storing and reading unit 19 extracts terminal IDs of request source terminals included in the addition approval request information one by one.

If the storage and reading unit 19 extracts a terminal ID of an addition request source terminal at Step S47-2 (Yes at Step S47-3), the display control unit 13 causes the display 120 to display an addition approval request screen as illustrated in FIG. 22 (Step S47-4). The addition approval request screen displays the terminal ID or the terminal name of the addition request source terminal, and displays a "yes" button to be pushed by the user of the addition request target terminal (telephone terminal 70ab) when the user approves registration of the addition request target terminal (telephone terminal 70ab) in the destination list of the addition request source terminal (telephone terminal 10aa), a "no" button to be pushed by the user when the user rejects the registration in the destination list, and a "cancel" button to be pushed by the user when the user suspends the decision on approval or rejection. When the addition approval request screen displays a terminal name of the addition request source terminal, the addition approval request information transmitted at Step S46 also includes the terminal name of the request source terminal in addition to the terminal ID thereof. In this case, the terminal name of the request source terminal is also extracted when the operating condition is determined at Step S45.

When the user of the addition request target terminal pushes any one of the "yes", "no", and "cancel" buttons on the addition approval request screen illustrated in FIG. 22, the operation input receiving unit 12 receives any one of instructions of "approval", "rejection", and "suspension" (Step S47-5). The processing is returned to Step S47-2 and repeated by extracting the terminal IDs of the rest of the addition request source terminals stored in the storage unit 1000. If all the terminal IDs of the addition request source terminals are extracted (No at Step S47-3), the processing at Step S47 is ended.

The description returns to processing illustrated in FIG. 18. The transmission and reception unit 11 of the addition request target terminal (telephone terminal 70ab) transmits addition request response information indicating an addition request response of approval, rejection, or suspension to the telephone management system 50 (Step S48). With this, the transmission and reception unit 51 of the telephone management system 50 receives the addition request response information. The following continues describing a case in which the addition request response indicates "approval".

The management unit 53 additionally manages the terminal ID "07ab" of the addition request target terminal associated with the terminal ID "01aa" of the addition request source terminal in the addition request management DB 5004 (see FIG. 13) in association with the terminal ID "01aa" of the addition request source terminal that is the same terminal ID "01aa" of the addition request source terminal in the addition request management DB 5004 (see FIG. 13), in the destination list management DB (see FIG. 12) (Step S49).

If the addition request response indicates "rejection", the management unit 53 deletes, at Step S49, the record including the terminal ID "07ab" as the addition request target terminal that has rejected the request, from the addition request management DB 5004 (see FIG. 13). If the addition request response indicates "suspension", the management unit 53 does not perform any other additional management and leaves, at Step S49, the record as it is in the destination list management DB 5003 without deletion.

The storage and reading unit 59 searches the terminal management DB 5002 (see FIG. 11) on the bases of the terminal ID "01aa" of the addition request source terminal and the terminal ID "07ab" of the addition request target terminal to extract the corresponding pieces of information (terminal names, operating conditions) (Step S50). The transmission and reception unit 51 transmits addition completion information to the addition request source terminal (telephone terminal 10aa) and the addition request target terminal (telephone terminal 70ab) (Step S51-1, S51-2). The addition completion information transmitted to the addition request source terminal (telephone 10aa) includes a message indicating that the addition has been completed and information (terminal ID, terminal name, and operating condition) on the addition request target terminal (telephone terminal 70ab). In other words, the telephone management system 50 only transmits, to the addition request source terminal (telephone terminal 10aa), the information (terminal ID, terminal name, and operating condition) specifically on the addition request target terminal (telephone terminal 70ab) in the destination list, not transmitting the entire destination list again. The addition completion information transmitted to the addition request target terminal (telephone terminal 70ab) includes a message indicating that the addition has been completed and information (terminal ID, terminal name, and operating condition) on the addition request source terminal (telephone terminal 10aa).

The respective display control units 13 of the addition request source terminal (telephone terminal 10aa) and the addition request target terminal (telephone terminal 70ab) display a screen indicating completion on the displays (120, 715) (Step S52-1, S52-2). FIG. 23 illustrates an addition completion screen displayed on the display 120 of the addition request source terminal (telephone terminal 10aa). When the user of the addition request source terminal (telephone terminal 10aa) pushes an "OK" button, the processing of requesting to add a destination candidate is completed. Displaying the addition completion screen illustrated in FIG. 23 enables the user to know fast that the addition request has been approved, whereby the user can start a telephone call with the added destination candidate immediately after the approval.

After the processing at Step S51-1 and Step S51-2, the management unit 55 of the telephone management system 50 deletes, from the addition request management DB (see FIG. 13), the record of the terminal ID "07ab" of the addition request target terminal that has approved the request, and all the processing of adding a destination candidate is completed (Step S53).

Major Effect of Embodiment

In the embodiment described above, the telephone management system manages a group ID for identifying a group to which an addition request source terminal that is an addition request source requesting to add a destination candidate belongs, in association with a group ID for identifying a group to which an addition request target terminal that is an addition request target that can become the destination candidate belongs, whereby the telephone management system does not transmit an addition approval request to an addition request target terminal not being able to become the destination candidate. With this configuration, the telephone management system can make an approval request in accordance with various forms of services provided by the communication network (communication platform) and app providers such as a case in which different app providers (vendors) provide users with communication applications on the same communication network (communication platform), a case in which the same app provider (vendor) provides users with different communication applications, and a case in which the same app provider provides users with the same communication application but provides the users with different services depending on, for example, the service rates.

Supplement to Embodiment

The telephone management system 50 according to the above embodiment may include a single computer. The telephone management system 50 may be divided into a plurality of parts (functions or units) to which a plurality of computers are optionally assigned.

A recording medium storing therein a computer program for the telephone terminal (10, 70) and a recording medium storing therein a computer program for the telephone management system 50 according to the above embodiment, and the flash memory 104, the HD 504, and the EEPROM 704 storing therein the computer programs are provided as computer program products for the domestic or the international market. Examples of the recording media include a compact disc recordable (CD-R), a digital versatile disc (DVD), and a Blu-ray disc. The telephone terminal according to the above embodiment is an example of a communication terminal, and may be a telephone system such as the Internet protocol (IP) telephone and the Internet telephone, or other apparatuses having the communication function. Examples of the other apparatuses include car navigation devices, game players, wristwatches, and wearable computers.

The above embodiment describes, as an example of content data, image data as sight data and sound data as hearing data. The content data is not limited to these, but may be other senses data. For example, when the content data is touch data, the feel that a user experiences when touching something at one telephone terminal is transmitted to the other telephone terminal. When the content data is smell data, the smell that the user experiences at one telephone terminal is transmitted to the other telephone terminal. When the content data is taste data, the taste that the user experiences at one telephone terminal is transmitted to the other telephone terminal.

The content data may be at least one of the image (sight) data, the sound (hearing) data, the touch data, the smell data, and the taste data.

Although the above embodiment describes a case in which the telephone system 1 is used to hold, for example, a video conference, the embodiment is not limited to this. The telephone system 1 may be used for a meeting or general conversations between, for example, family members or friends, or may be used for one-way notification of information.

The IDs used in the above embodiment are identification information such as languages, characters, signs, or various types of symbols used to uniquely identify the IDs. The IDs may be identification information made by combining at least two of the languages, characters, signs, and various types of symbols.

Although, in the above embodiment, group IDs and group names are separately managed in FIGS. 14 and 15, the embodiment is not limited to this. In other words, the telephone management system may use the group names as an example of the group identification information for identifying a group without managing the group IDs.

The icons illustrated in FIG. 9 may include characters or may be pictorial symbols, or may be pictorial symbols including characters or signs.

Although the terminal management table illustrated in FIG. 11 manages a reception date and time, the embodiment is not limited to this. The table may manage at least reception time instead of the reception date and time.

Although the terminal management table illustrated in FIG. 11 manages IP addresses of terminals, the embodiment is not limited to this. The table may manage fully qualified domain names (FQDNs). In this case, IP addresses corresponding to the FQDNs are acquired through known domain name system (DNS) servers.

Although terminal IDs are used in the above embodiment, user IDs for identifying users may be used instead of using the terminal IDs.

According to an aspect of the present invention, as described above, by managing group identification information for identifying a group to which an addition request source terminal that is an addition request source requesting to add a destination candidate belongs, in association with group identification information for identifying a group to which an addition request target terminal that is an addition request target being able to become the destination candidate belongs, an approval request to an addition request target terminal not being able to become a destination candidate is not transmitted. Consequently, an approval request that conforms to a service form depending on a communication network, an application provider, and/or the like can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

EXPLANATIONS OF LETTERS OR NUMERALS

1 Telephone system (an example of a communication system)
2 Communication network
10 Telephone terminal (an example of a communication terminal)
11 Transmission and reception unit
12 Operation input receiving unit
13 Display control unit
19 Storage and reading unit
21 Transmission and reception unit
22 Startup unit
23 Creation unit
24 Display control unit
25 Function execution unit
29 Storage and reading unit
50 Telephone management system (an example of a communication management system)
51 Transmission and reception unit (an example of transmission controlling unit, an example of receiving unit)
52 Authentication unit
53 Management unit
54 Determining unit (an example of determining unit)
59 Storage and reading unit (an example of reading unit)
1000 Storage unit
1001 Visual information management DB
5000 Storage unit
5001 Authentication management DB
5002 Terminal management DB
5003 Destination list management DB
5004 Addition request management DB
5005 Group use terminal management DB (an example of group use terminal management unit)
5006 Group management DB (an example of group management unit)

What is claimed is:

1. A communication management system that receives, from a certain communication terminal, an addition request requesting to add a destination candidate and transmits, to another communication terminal, an approval request asking whether to approve the addition request, the communication management system comprising:
    processing circuitry configured to
        manage, as group use terminal management information, group identification information for identifying a certain group in association with terminal identification information for identifying a communication terminal belonging to the certain group,
        manage, as group management information, group identification information for identifying a group to which an addition request source terminal that is an addition request source requesting to add the destination candidate belongs, in association with group identification information for identifying a group to which an addition request target terminal that is an addition request target being able to become the destination candidate belongs;
        receive an addition request transmitted by a first communication terminal, the addition request requesting to add a second communication terminal as a destination candidate to be included on a destination candidate list for the first communication terminal;
        receive first terminal identification information for identifying the first communication terminal and second terminal identification information for identifying the second communication terminal,
        prevent transmission of the approval request to the second communication terminal based on reception of the addition request when a first group identification information corresponding, in the group use terminal management information, to the first terminal identification information received is the group identification information for the addition request source terminal in the group management information, and the second group identification information corresponding, in the group use terminal management information, to the second terminal identification information received is not included in at least one corresponding piece of group identification information for the addition request target terminal in association with the group of the first communication terminal in the group management information, wherein each group is a unit for receiving service when using a communication platform, and the processing circuitry manages the first group identification information in association with a name of a respective group and the second group identification, wherein the name of the respective group corresponds to a type of the received service for the respective group and is separate from the first group identification information.

2. The communication management system according to claim 1, wherein the processing circuitry is further configured to read, by searching the group use terminal management information based on the received first terminal identification information, the corresponding first group identification information and reads, by searching the group use terminal management information based on the received second terminal identification information, the corresponding second group identification information; and determine, when the first group identification information read by the processing circuitry is the group identification information for the addition request source terminal in the group management information, whether the second group identification information read by the processing circuitry is included in at least one corresponding piece of group identification information for the addition request target terminal in the group management information, wherein when the processing circuitry determines that the second group identification information is not included, the processing circuitry does not transmit the approval request to the second communication terminal.

3. The communication management system according to claim 1, wherein the communication terminal is a mobile phone.

4. The communication management system according to claim 1, wherein the communication terminal is a car navigation device installable on an automobile.

5. The communication management system according to claim 1, wherein there are a plurality of groups managed in the group management information, and each group represents a different level of paid service.

6. The communication management system according to claim 5, wherein in the group management information, a group corresponding to an addition request source terminal having a highest level of paid service includes a greater number of associated groups representing addition request target terminals in comparison to a group corresponding to a lowest level of paid service.

7. A communication management method performed by a communication management system that receives, from a certain communication terminal, an addition request requesting to add a destination candidate and transmits, to another communication terminal, an approval request asking whether to approve the addition request, the method, implemented by processing circuitry of the communication management system, comprising:

managing, as group use terminal management information, group identification information for identifying a certain group in association with terminal identification information for identifying a communication terminal belonging to the certain group, managing, as group management information, group identification information for identifying a group to which an addition request source terminal that is an addition request source requesting to add the destination candidate belongs, in association with group identification information for identifying a group to which an addition request target terminal that is an addition request target being able to become the destination candidate belongs;

receiving an addition request transmitted by a first communication terminal, the addition request requesting to add a second communication terminal as a destination candidate to be included on a destination candidate list for the first communication terminal;

receiving first terminal identification information for identifying the first communication terminal and second terminal identification information for identifying the second communication terminal, and preventing transmission of the approval request to the second communication terminal based on reception of the addition request when a first group identification information corresponding, in the group use terminal management information, to the first terminal identification information received is the group identification information for the addition request source terminal in the group management information, and the second group identification information corresponding, in the group use terminal management information, to the second terminal identification information received is not included in at least one corresponding piece of the group identification information for the addition request target terminal in association with the group of the first communication terminal in the group management information, wherein each group is a unit for receiving service when using a communication platform, and the method includes managing the first group identification information in association with a name of a respective group and the second group identification, wherein the name of the respective group corresponds to a type of the received service for the respective group and is separate from the first group identification information.

8. A non-transitory computer-readable recording medium for storing therein a computer program that includes instructions which when executed on a communication management system, that receives, from a certain communication terminal, an addition request requesting to add a destination candidate and transmits, to another communication terminal, an approval request asking whether to approve the addition request, causes the communication management system to execute a method, comprising:

managing, as group use terminal management information, group identification information for identifying a certain group in association with terminal identification information for identifying a communication terminal belonging to the certain group, managing, as group management information, group identification information for identifying a group to which an addition request source terminal that is an addition request source requesting to add the destination candidate belongs, in association with group identification information for identifying a group to which an addition request target terminal that is an addition request target being able to become the destination candidate belongs;

receiving an addition request transmitted by a first communication terminal, the addition request requesting to add a second communication terminal as a destination candidate to be included on a destination candidate list for the first communication terminal;

receiving first terminal identification information for identifying the first communication terminal and second terminal identification information for identifying the second communication terminal, and preventing transmission of the approval request to the second communication terminal based on reception of the addition request when a first group identification information corresponding, in the group use terminal management information, to the first terminal identification information received is the group identification information for the addition request source terminal in the group management information, and the second group identification information corresponding, in the group use terminal management information, to the second terminal identification information received is not included in at least one corresponding piece of group identification information for the addition request target terminal in association with the group of the first communication terminal in the group management information, wherein each group is a unit for receiving service when using a communication platform, and the method includes managing the first group identification information in association with a name of a respective group and the second group identification, wherein the name of a respective group corresponds to a type of the received service for the respective group and is separate from the first group identification information.

* * * * *